United States Patent
Harvey et al.

(10) Patent No.: US 12,118,582 B2
(45) Date of Patent: Oct. 15, 2024

(54) TECHNICAL IMPROVEMENTS TO PAYMENT CARD LINKED REWARDS PROGRAMS

(71) Applicant: Social Media, LLC, Guaynabo, PR (US)

(72) Inventors: Dacotah Harvey, St. Catharines (CA); Jordan Michael Code, Niagara Falls (CA); Jose Carlos Villares Vaillant, San Juan, PR (US); Nancy Torres, Bayamón, PR (US); Carlos Villares, Miami, FL (US); Omar Ramos Muniz, Dorado, PR (US); Yilka Rivera, Vega Alta, PR (US); José Luis Rivera Torres, San Juan, PR (US); Gustavo Villares, Guaynabo, PR (US); Peter Karl Melhado, St. Andrew (JM); Luke Todesco, Dorado, PR (US); Vikram Dhiman, Kingston (JM); Zachary Fahrer, Guaynabo, PR (US); Andrew Erickson Draxton, Cincinnati, OH (US)

( * ) Notice: Subject to any disclaimer, the term of this patent is extended or adjusted under 35 U.S.C. 154(b) by 0 days.

(21) Appl. No.: 18/329,484

(22) Filed: Jun. 5, 2023

(65) Prior Publication Data
US 2023/0385867 A1 Nov. 30, 2023

Related U.S. Application Data

(63) Continuation-in-part of application No. PCT/US2021/072746, filed on Dec. 4, 2021.
(Continued)

(51) Int. Cl.
G06Q 30/00 (2023.01)
G06Q 20/34 (2012.01)
(Continued)

(52) U.S. Cl.
CPC ....... *G06Q 30/0229* (2013.01); *G06Q 20/354* (2013.01); *G06Q 20/387* (2013.01); *G06Q 30/0233* (2013.01)

(58) Field of Classification Search
CPC ............ G06Q 30/0229; G06Q 20/354; G06Q 20/387; G06Q 30/0233
See application file for complete search history.

(56) References Cited

U.S. PATENT DOCUMENTS 7,686,218 B2  3/2010  Hessburg et al.
8,265,993 B2  9/2012  Chien et al.
(Continued)

OTHER PUBLICATIONS

X. JunWu and X. Fang, "Developing Smart Card Application with PC/SC," 2011 International Conference on Internet Computing and Information Services, Hong Kong, China, 2011, pp. 286-289, doi: 10.1109/ICICIS.2011.76. (Year: 2011).*
(Continued)

*Primary Examiner* — Sun M Li
(74) *Attorney, Agent, or Firm* — FisherBroyles, LLP

(57) ABSTRACT

A rewards system operator receives one or more files from a payment card processor containing payment card transaction information for qualifying payment card transactions made with linked payment cards at one or more merchants participating in a rewards program. The rewards system operator directly debits the merchants for any fees owed under the rewards program. The rewards system operator gives users of the linked payment cards a reward for making qualifying purchases under the rewards program.

21 Claims, 15 Drawing Sheets

Related U.S. Application Data

(60) Provisional application No. 63/121,909, filed on Dec. 5, 2020.

(51) Int. Cl.
*G06Q 20/38* (2012.01)
*G06Q 30/0226* (2023.01)

(56) References Cited

U.S. PATENT DOCUMENTS

| | | | |
|---|---|---|---|
| 9,665,880 | B2 | 5/2017 | Aloni et al. |
| 10,115,112 | B2 | 10/2018 | Fordyce, III |
| 10,262,303 | B2 * | 4/2019 | Powell ............... G06Q 20/387 |
| 10,789,607 | B2 | 9/2020 | Fordyce, III |
| 2003/0200141 | A1 | 10/2003 | Robison |
| 2003/0236704 | A1 * | 12/2003 | Antonucci ......... G06Q 30/0283 |
| | | | 705/14.3 |
| 2004/0140361 | A1 * | 7/2004 | Paul .................. G06Q 20/357 |
| | | | 235/462.45 |
| 2005/0240477 | A1 | 10/2005 | Friday et al. |
| 2008/0021772 | A1 | 1/2008 | Aloni et al. |
| 2009/0171778 | A1 * | 7/2009 | Powell ............... G06Q 20/387 |
| | | | 705/14.1 |
| 2010/0057580 | A1 * | 3/2010 | Raghunathan ..... G06Q 20/3572 |
| | | | 705/17 |
| 2011/0238471 | A1 | 9/2011 | Trzcinski |
| 2012/0059701 | A1 * | 3/2012 | van der Veen ....... G06Q 20/387 |
| | | | 705/14.17 |
| 2012/0209749 | A1 | 8/2012 | Hammad et al. |
| 2012/0284108 | A1 | 11/2012 | Fontana et al. |
| 2013/0238408 | A1 | 9/2013 | Cooke et al. |
| 2013/0304576 | A1 * | 11/2013 | Berland ............. G06Q 30/0236 |
| | | | 705/14.53 |
| 2013/0311266 | A1 * | 11/2013 | Vichich ............. G06Q 30/0207 |
| | | | 705/14.27 |
| 2013/0317900 | A1 | 11/2013 | Fennel et al. |
| 2015/0019317 | A1 * | 1/2015 | Mitchell ............ G06Q 30/0226 |
| | | | 705/14.27 |
| 2018/0082322 | A1 | 3/2018 | Sharma et al. |
| 2018/0300727 | A1 * | 10/2018 | Alexander, IV ....... G06Q 20/00 |
| 2020/0065847 | A1 | 2/2020 | Harrison et al. |
| 2020/0219074 | A1 | 7/2020 | Vossoughi |

OTHER PUBLICATIONS

Global Reward Search and Redemption Platform An IP.com Prior Art Database Technical Disclosure Authors et. al.: Hassan Abolhassani IP.com No. IPCOM000251309D IP.com Electronic Publication Date: Oct. 30, 2017 (Year: 2017).*
A. S. Jawale and J. S. Park, "A Security Analysis on Apple Pay," 2016 European Intelligence and Security Informatics Conference (EISIC), Uppsala, Sweden, 2016, pp. 160-163, doi: 10.1109/EISIC.2016.041. (Year: 2016).*
International Search Report and Written Opinion from related Int'l Pat. App. PCT/US2021/072746, Feb. 17, 2022 (8 pp.).
Miller, "Card-linked Offers: Innovations in Loyalty that Cannot be Ignored," Dosh, Feb. 22, 2019 (7 pp.).
Communication: European Search Report from counterpart EP Pat. App. 21901668.0, European Patent Office, Mar. 6, 2024 (9 pp.).

* cited by examiner

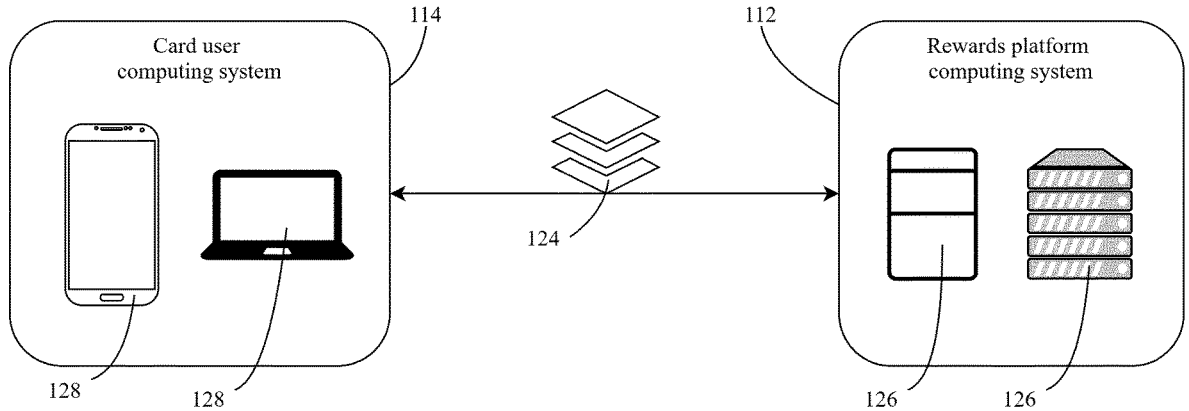
Fig. 4
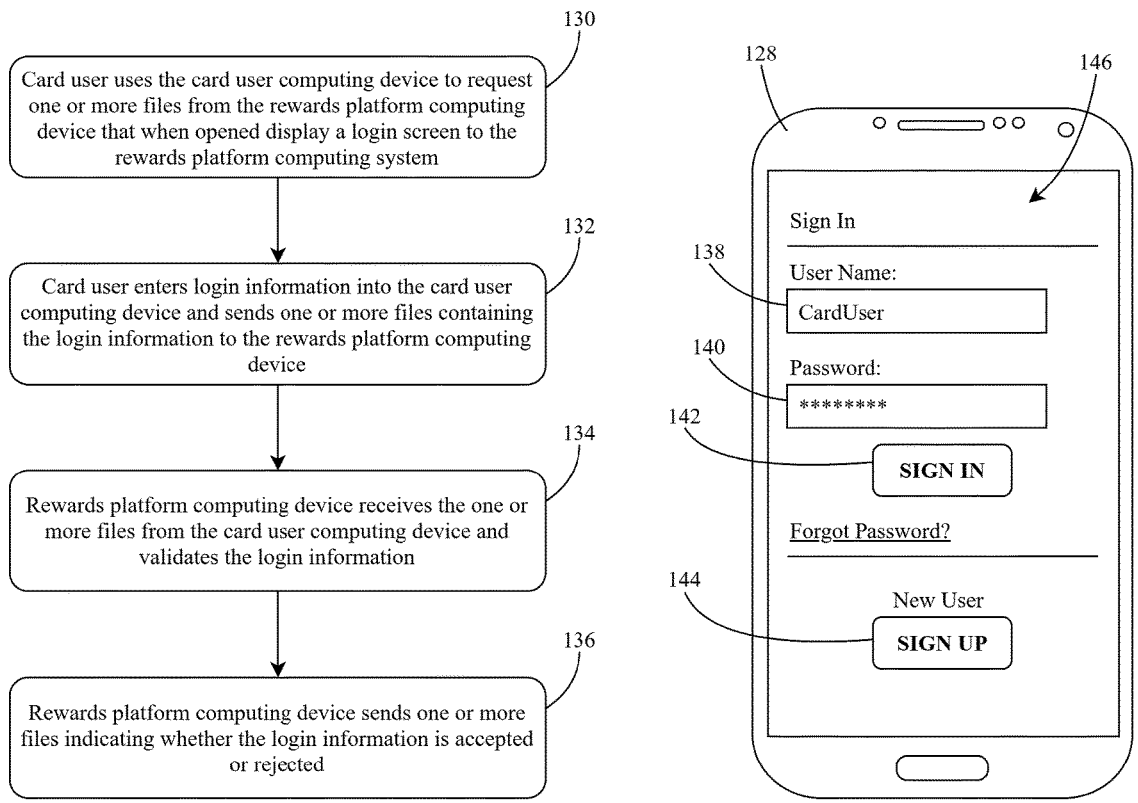
Fig. 5
Fig. 6

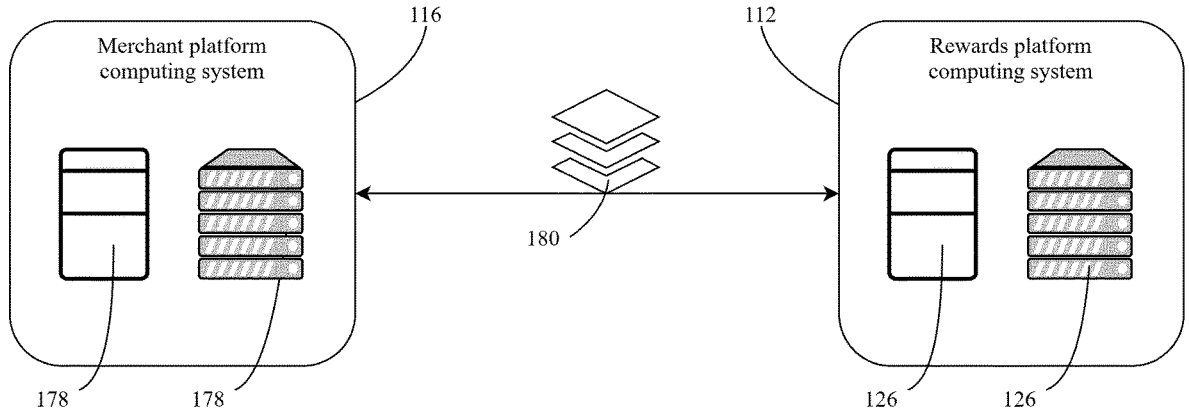
Fig. 12
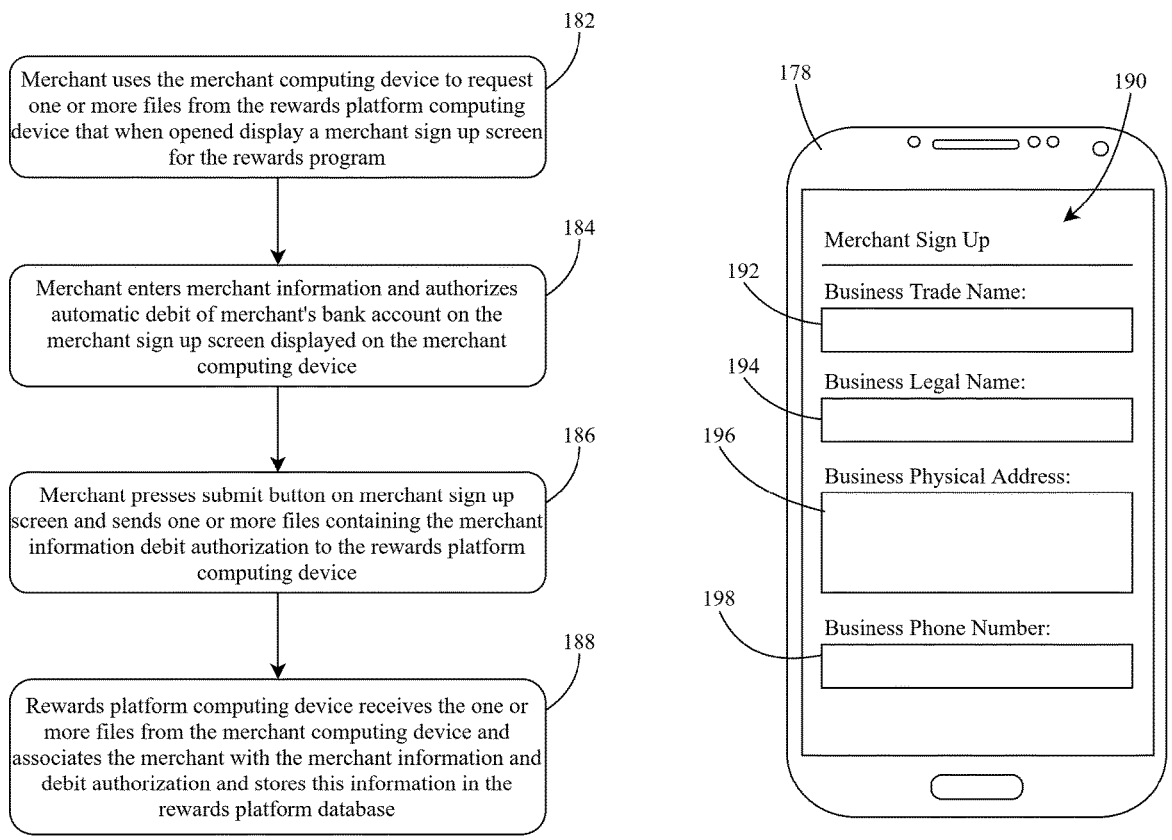
Fig. 13
Fig. 14

TECHNICAL IMPROVEMENTS TO PAYMENT CARD LINKED REWARDS PROGRAMS

TECHNICAL FIELD

This relates to technical improvements to payment card linked rewards programs, particularly those that offer payment card users one-time discounts and/or reward credits for making purchases at participating merchants.

BACKGROUND

Customer loyalty programs are designed to encourage customers to continue to shop at or use the services of a business associated with the program. Such programs have become common and are used in a wide variety of industries.

The most common type of conventional loyalty program is set up by a business to reward customers that make repeat purchases. The business gives the customer a loyalty card that identifies the cardholder as a participant in the program. Cards may have a barcode or magstripe to make them easier to scan, although some are chip cards or proximity cards.

The customer presents the loyalty card to receive either a discount on the current purchase or an allotment of points that can be used for future purchases. In recent years, businesses sometimes offer the loyalty card in the form of a loyalty app, which is less likely to be lost by the customer.

One type of loyalty program is a card linked offer (CLO) program. CLO programs connect offers or discounts directly to a customer's credit/debit card, which can then be redeemed at the point of sale. Customers sign-up for a CLO program and provide their credit/debit card information.

The customer reviews available card linked offers and selects those the customer wants. The customer links the CLO to his/her credit/debit card. The customer can then make a purchase at a designated retailer and the savings appears as a cash-back credit directly on the customer's bank, credit card, or other financial account.

Although traditional loyalty and CLO programs offer a number of benefits, they also suffer from a number of problems. One problem is that traditional programs have one option or limited options for rewards redemption. For example, conventional loyalty programs offer rewards for only the business running the program. This results in waning user interest because loyalty rewards are spread across too many rewards programs with limited redemption options. This also results in rewards programs offering cash rewards to hold user interest. However, cash rewards are often not enough to materially change user behavior, are expensive to the program, and, once awarded, terminate user interaction with the program.

Another problem with CLO programs is that they are often specific to one brand of payment card that is associated with a sponsoring payment card association (e.g., Visa, Mastercard, Discover, American Express, etc.). The payment card association reports qualifying transactions to the program operator, which limits the CLO program to payment cards that belong to the payment card association.

Another problem with traditional CLO programs is that they require the program operator to invoice and collect amounts owed by merchants. Merchants treat the invoices as a regular account payable that is paid 60 to 90 days after receiving the invoice. This creates a cash flow problem for the program operators because they either need to wait the same 60 to 90 says to issue rewards or they need to fund the cash-back reward before they can collect from the merchants.

GENERAL DESCRIPTION

A rewards program includes technical improvements that allow payment card users to earn rewards by using one or more linked payment cards to make purchases at a participating merchant. The card user can earn rewards in a variety of formats including cash-back, reward credits, and the like. The following are high level variations of the rewards program that can be implemented separately or in combination.

In some embodiments, the card user provides the card number of one or more payment cards to a rewards program operator. The card number(s) is associated with the user and stored in a database in one or more computer systems owned and/or controlled by the rewards system operator.

In some embodiments, the rewards program operator sends the card number(s) to one or more payment card transaction reporters. This can be done by transferring one or more files from the rewards program operator to the payment card transaction reporter(s) containing the payment card number(s). The payment card transaction reporter(s) saves the card number in a database along with other payment card numbers that are linked to the rewards program. In some embodiments, the payment card transaction reporter is a payment card processor. In other embodiments, the payment card transaction reporter is a payment card association.

In some embodiments, the rewards program operator sends the name or other identifier of each participating merchant to the payment card transaction reporter(s). This can be done by transferring one or more files from the rewards program operator to the payment card transaction reporter(s) containing the name and/or other identifier of each participating merchant. The payment card transaction reporters receive the file(s) and store the merchant information in a database. In some embodiments, the name or identifier of each merchant is unique for each payment card transaction reporter.

In some embodiments, the payment card transaction reporter(s) monitors payment card transactions at participating merchants and identifies those made with a linked payment card as qualifying transactions under the rewards program. This can be done by monitoring one or more files transferred from the participating merchants to the payment card transaction reporter(s) containing payment card transaction information. The payment card transaction reporter(s) notify the rewards program operator of the qualifying payment card transactions. The rewards program operator gives the card user a reward for the qualifying payment card transaction.

In some embodiments, the participating merchants agree to allow the rewards program operator to directly debit any amounts owed under the rewards program from the merchant's bank account at the time of or shortly after the qualifying payment card transaction. This can be done by having the merchants provide the necessary bank account information and signed authorization forms when they sign up to participate in the rewards program. The rewards program operator can directly debit the merchant's bank account upon receiving a notification of a qualifying payment card transaction from a payment card transaction reporter.

In some embodiments, the rewards program operator gives the card user reward credits for participating in the rewards program. The reward credits can be redeemed for goods and/or services offered as part of the rewards program or by third parties. In some embodiments, the reward credits can be treated as a virtual currency that can be used to pay for goods and/or services on third party platforms.

In some embodiments, the rewards program operator can offer a variable amount of reward credits based on certain actions taken by the card user. For example, the amount of reward credits can be adjusted depending on the type of payment card used to make the purchase—e.g., purchases made with debit cards, cards issued by the rewards program operator, gift cards, and the like may be given more reward credits than purchases made with credit cards. In another example, the amount of reward credits can be increased for visiting the same merchant a specified number of times (e.g., two or more) in a specified period of time (e.g., monthly, bimonthly, etc.). In another example, the amount of reward credits can be increased based on the number of other card users referred to the rewards program.

In some embodiments, the rewards program operator can offer discounted fees to participating merchants who sign up additional card users to the rewards program. For example, a participating merchant can sign a new card user to the rewards program and receive a discount on the fee owed to the rewards program operator for every visit made by the new card user to merchant for a specified amount of time or forever.

In some embodiments, the rewards program operator can offer fees to banks and/or card issues who sign up additional card users to the rewards program. For example, a bank or card issuer can sign a new card user to the rewards program and receive a fee for amounts paid by the new card user to merchant in the program for a specified amount of time or forever.

The general description is provided to give a general introduction to the described subject matter as well as a synopsis of some of the technological improvements and/or advantages it provides. The general description and background are not intended to identify essential aspects of the described subject matter, nor should they be used to constrict or limit the scope of the claims. For example, the scope of the claims should not be limited based on whether the recited subject matter includes any or all aspects noted in the general description and/or addresses any of the issues noted in the background.

DESCRIPTION OF DRAWINGS

The preferred and other embodiments are described in association with the accompanying drawings in which:

FIG. 4 is a block diagram of one embodiment of a card user computing system communicatively linked with a rewards platform computing system.

FIG. 5 is a flowchart of one embodiment of a process by which a card user can log into a rewards platform computing system.

FIG. 6 show a screenshot of one embodiment of a login screen displayed on the card user computing device. The login screen is used to login to the rewards platform computing system.

FIG. 12 is a block diagram of one embodiment of a rewards platform computing system communicatively linked with a merchant platform computing system.

FIG. 13 is a flowchart of one embodiment of a process by which a merchant can sign up for a rewards program including providing an authorization to directly debit amounts owed under the rewards program.

FIGS. 14-16 show screenshots of one embodiment of a merchant sign-up screen displayed on the merchant computing device. The merchant sign-up screen is used by the merchant to sign up to be part of the rewards program.

DETAILED DESCRIPTION OF EMBODIMENTS

Figure 1:
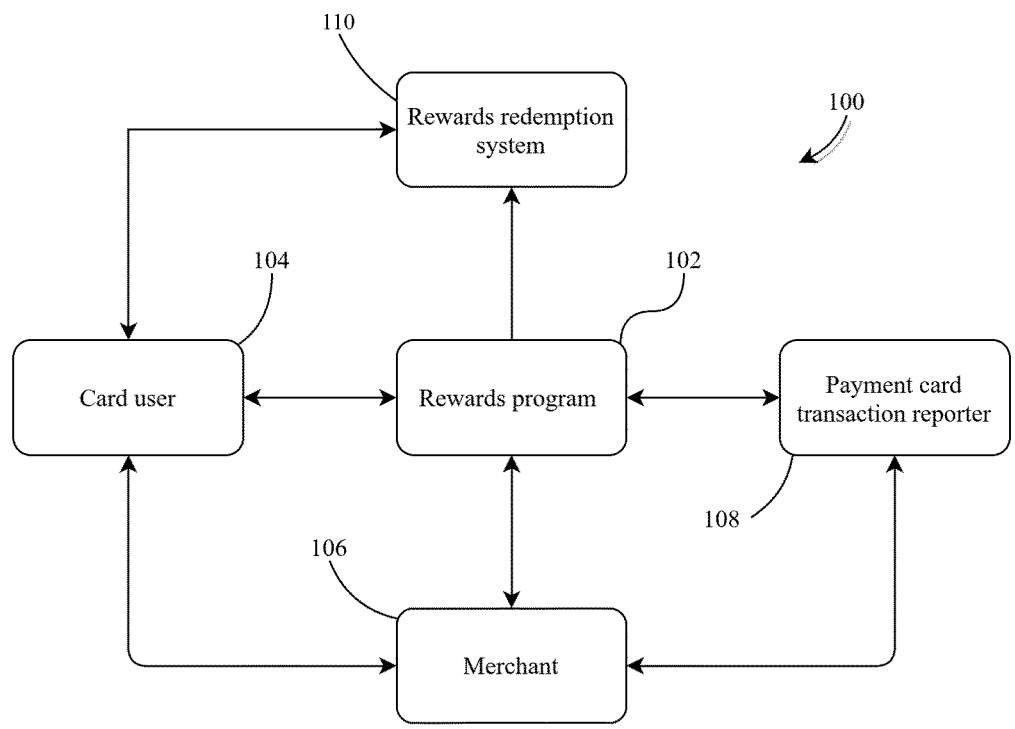
FIG. 1 is a block diagram of one embodiment of a card linked rewards ecosystem.

FIG. 1 shows a block diagram of one embodiment of a card linked rewards ecosystem 100. The card linked rewards ecosystem 100 includes a rewards program 102 operated by a rewards program operator, a card user 104, a merchant 106, a payment card transaction reporter 108, and a rewards redemption system 110. The arrows show how the various entities 102, 104, 106, 108, 110 typically interact with each other in the rewards ecosystem 100. It should be appreciated, however, that any of the entities 102, 104, 106, 108, 110 can interact or communicate with any of the other entities 102, 104, 106, 108, 110 in any suitable manner.

In some embodiments, FIG. 1 can be viewed as showing ways that the different entities 102, 104, 106, 108, 110 can communicate electronically with each other. Electronic communications can include transferring one or more files or data from one entity 102, 104, 106, 108, 110 to another entity 102, 104, 106, 108, 110 with or without traveling through one or more intermediate entities.

Figure 2:
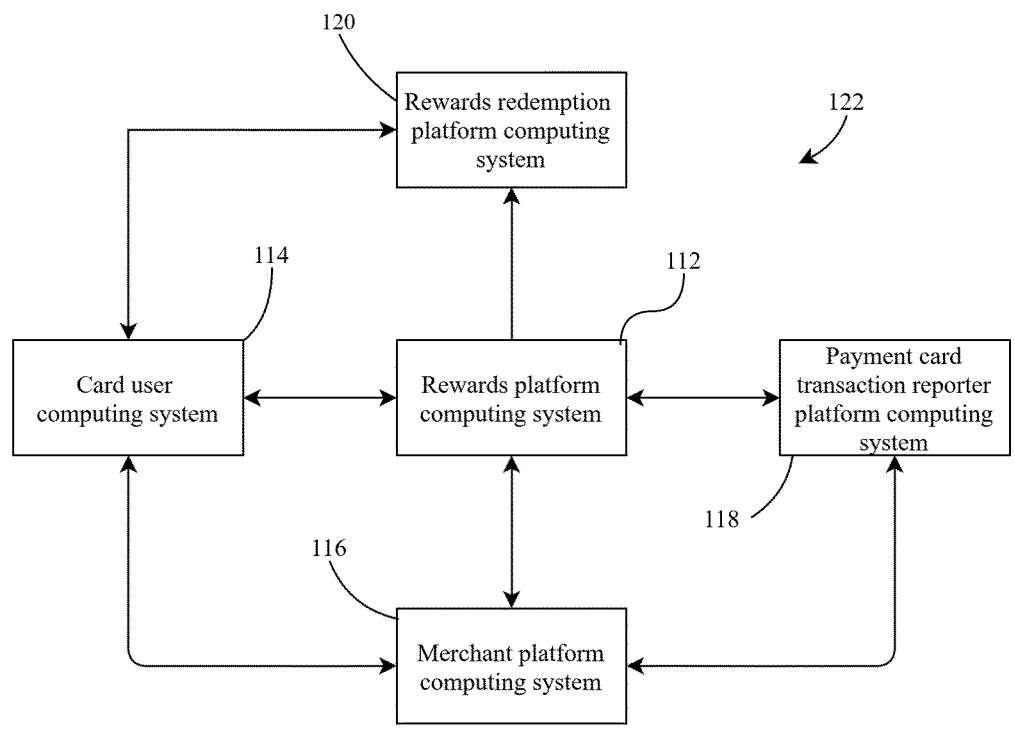
FIG. 2 is a block diagram of one embodiment of a card linked rewards computing ecosystem.

FIG. 2 shows a block diagram of a card linked rewards computing ecosystem 122. Referring to FIG. 2, each entity 102, 104, 106, 108, 110 can include a corresponding computing system 112, 114, 116, 118, 120, respectively, including one or more computing devices 101. For example, the rewards program 102 can include a rewards platform computing system 112. The card user 104 can include a card user computing system 114. The merchant 106 can include a merchant platform computing system 116. The payment card transaction reporter 108 can include a payment card transaction reporter platform computing system 118. The rewards redemption system 110 can include a rewards redemption platform computing system 120.

The arrows show how the various computing systems 112, 114, 116, 118, 120 typically communicate with each other in the rewards computing ecosystem 122. It should be appreciated however that any of the computing systems 112, 114, 116, 118, 120 can communicate with any of the other computing systems 112, 114, 116, 118, 120 as desired. In some embodiments, the communications can travel through one or more intermediaries before reaching the other system(s).

It should be appreciated that the computing systems 112, 114, 116, 118, 120 and any other computing devices described in this document can communicate with each other using encryption and/or one or more secure protocols. For example, websites may be accessed using HTTPS, file transfers may be accomplished using a secure file transfer protocol (SFPT or SSH File Transfer Protocol), or the like. The same secure protocols can be used for intra-platform communications.

It should also be appreciated that the computing systems 112, 114, 116, 118, 120 and any other computing devices described in this document can communicate with each other using standardized input/output interfaces. For example, the computing systems 112, 114, 116, 118, 120 can include an application programming interface that provides a standardized way for other computing systems and/or computing devices to communication with the computing systems 112, 114, 116, 118, 120.

Figure 3:
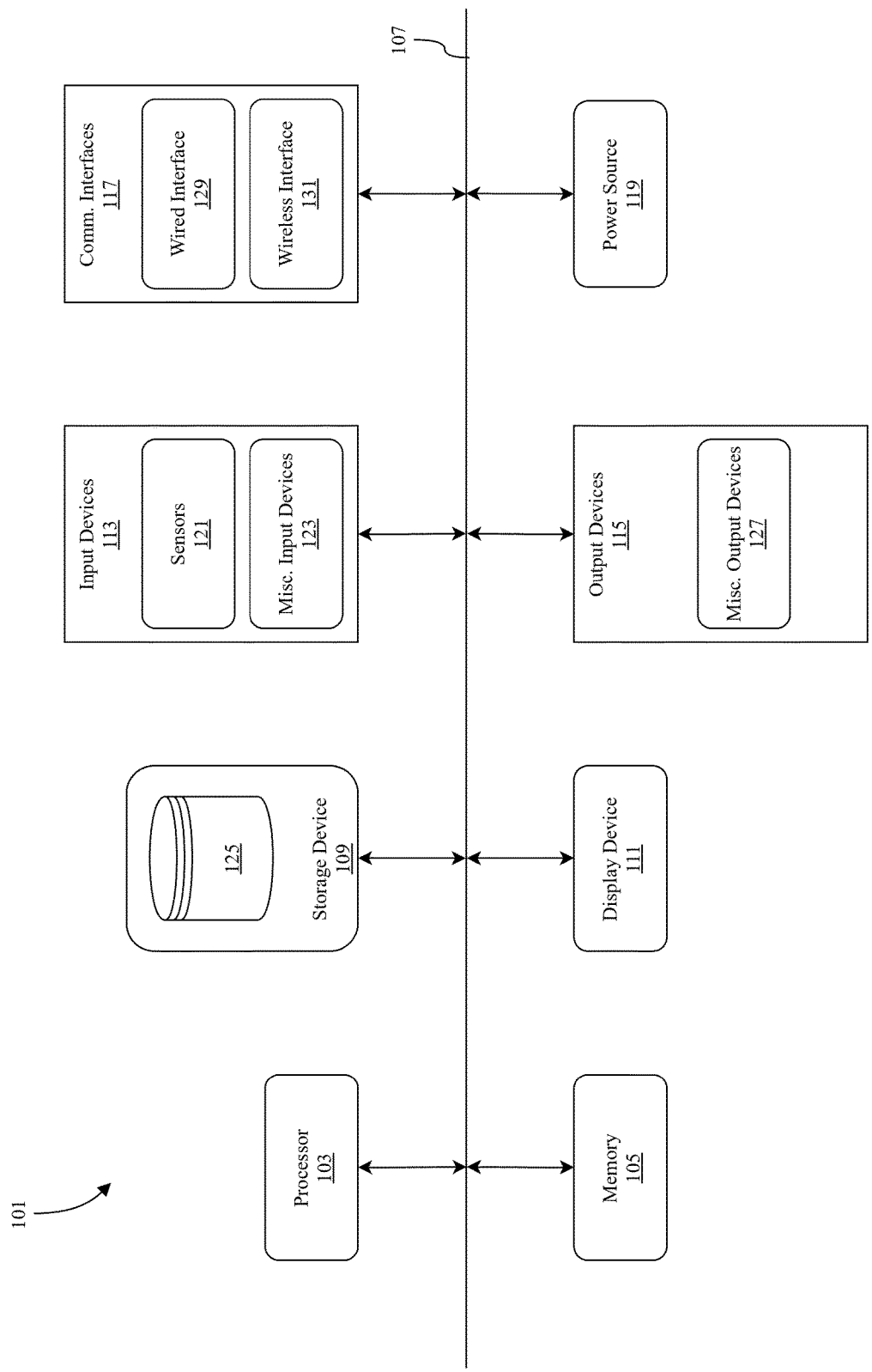
FIG. 3 is a block diagram of one embodiment of a computing device that can be used by any of the entities in the card linked rewards computing ecosystem.

FIG. 3 shows a block diagram of one embodiment of a computing device 101 that can be used in any of the computing systems 112, 114, 116, 118, 120. The computing device 101 is described in greater detail below in the section titled electronic computing device.

FIG. 4 shows a block diagram of one embodiment of the rewards platform computing system 112 communicatively linked to the card user computing system 114. The rewards platform computing system 112 includes one or more rewards platform computing devices 126. The card user computing system 114 includes one or more card user computing devices 128. The computing devices 126, 128 can be any suitable computing devices such as, for example, the computing devices 101. The computing systems 112, 114 can share digital information with each other in the form of data or files 124 either directly or by way of one or more intermediate computing platforms or devices (e.g., the Internet).

The card user computing devices 128 are shown in FIG. 4 as a mobile phone and a laptop computer. However, it should be appreciated that the card user 104 can use any suitable computing device capable of communicating with the rewards platform computing system 112. For example, the card user computing devices 128 can be also include a desktop computer, tablet, or the like.

Likewise, the rewards platform computing devices 126 are shown in FIG. 4 as a desktop computer and a server. However, it should be appreciated that the rewards platform computing system 112 can use other rewards platform computing devices 126 to communicate with the card user 104. For example, the rewards platform computing system 112 can use a laptop computer, tablet, or the like to communicate with the card user 104.

The rewards platform computing system 112 and the card user computing system 114 can communicate with each other in a variety of ways. In some embodiments, the rewards platform computing system 112 includes one or more files 124 that can be retrieved by and displayed on the card user computing devices 128. For example, the one or more files 124 can be displayed as a webpage on the card user computing devices 128. In some embodiments, the card user computing devices 128 can include an app or desktop software that directly accesses one or more files from the rewards platform computing system 112.

FIG. 5 shows a flowchart of one embodiment of a process by which the card user 104 can log into the rewards platform computing system 112. At step 130, the card user 104 uses the card user computing device 128 to request one or more files 124 from the rewards platform computing device 126. The one or more files 124 can be opened on the card user computing device 128 with software such as a web browser or mobile app to display a login screen 146.

FIG. 6 shows one example of the login screen 146 including a username input box 138, a password input box 140, a sign in button 142, and a sign-up button 144. It should be noted that any user interface feature referred to as a box can also be referred to as a field. For example, the username input box 138 can also be referred to as the username input field 138. It should be appreciated that the login screen 146 can be changed in a variety of ways and have a variety of different configurations beyond what is shown in FIG. 6.

Returning to FIG. 5, at step 132, the card user 104 enters login information in the login screen 146 of the card user computing device 128. The user 104 presses the sign in button 142 on the login screen 146, and the card user computing device 128 sends one or more files 124 containing the login information to the rewards platform computing device 126.

At step 134, the rewards platform computing device 126 receives the one or more files 124 containing the login information. The rewards platform computing device 126 validates the login information by comparing it to the login information stored for the card user 104 in one or more rewards platform databases.

If the login information from the card user 104 matches the login information stored in the rewards platform database, then the login information is accepted, and the user is logged into the rewards platform computing system 112. If the login information from the card user 104 does not match the login information stored in the rewards platform database, then the login information is rejected, and the user is not logged in to the rewards platform computing system 112.

At step 136, the rewards platform computing device 126 sends one or more files 124 to the card user computing device 128 indicating whether the login information is accepted or rejected. In those situations where the login information is accepted, the one or more files 124 can simply include account information that would only be provided if the login was successful. For example, the one or more files 124 can include the card user's account information, which can be displayed on the card user computing device 128 as a way of indicating that the login was successful.

If the card user 104 is a new user, then the card user will need to sign up and create an account with the rewards platform computing system 112. This can be done by pressing the sign-up button 144 on the login screen 146 to display a sign-up screen (not shown). The sign-up screen can be like the login screen 146 except it can include additional boxes for information such as the first and last name of the card user 104 as well as any additional information the rewards platform computing the rewards program 102 may require. In some embodiments, the card user can provide a variety of card user information (e.g., email address, mailing address, and the like) to the rewards platform computing system 112.

The sign-up information provided by the card user 104 can be transferred between the card user computing device 128 and the rewards platform computing device 126 in the same or a similar manner as that described in connection with the login information. The rewards platform computing system 112 can use the sign-up information to create an account for the card user 104 and store the relevant information in the rewards platform database.

Figure 7:
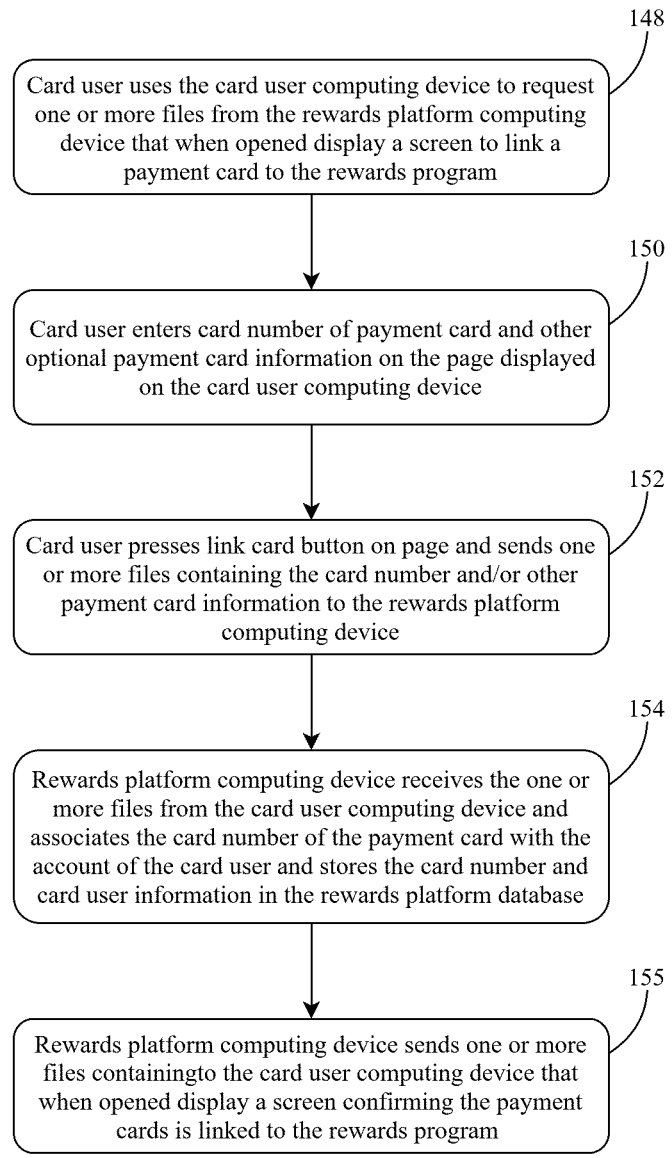
FIG. 7 is a flowchart of one embodiment of a process by which a card user can link a payment card to the rewards program.

FIG. 7 shows a flowchart of one embodiment of a process by which the card user 104 can link a payment card 172 (FIG. 10) to the rewards program 102. At step 148, the card user 104 uses the card user computing device 128 to request one or more files 124 from the rewards platform computing device 126. The one or more files 124 can be opened on the card user computing device 128 to display a card link screen 156 used to link the payment card 172 to the rewards program 102.

Figure 8:
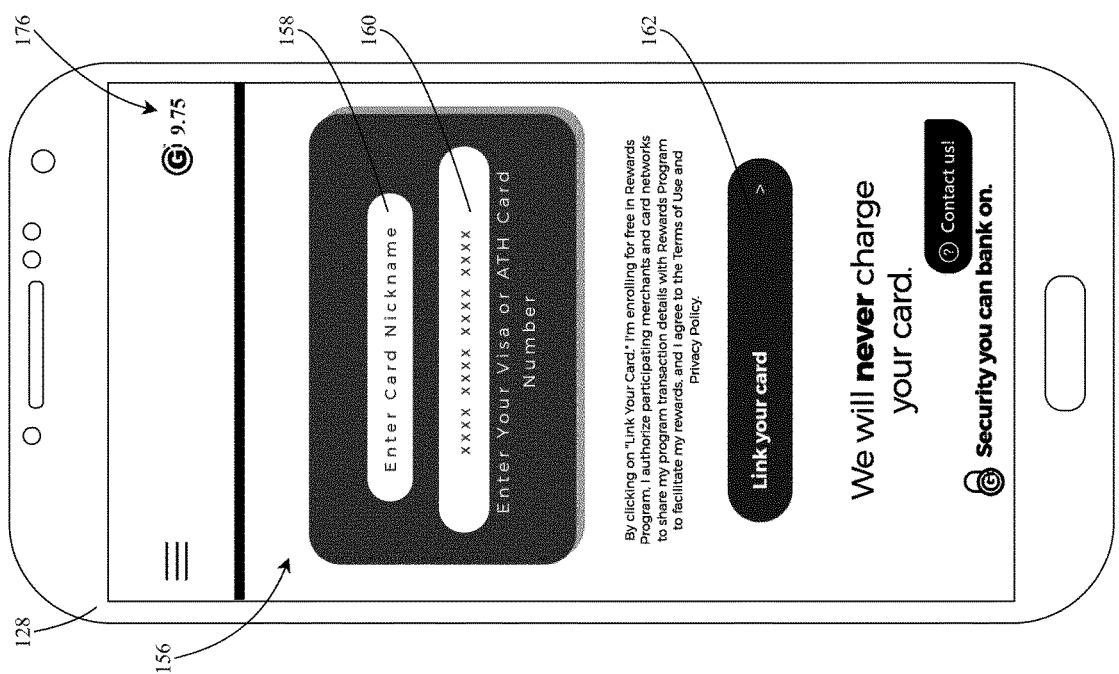
FIG. 8 show a screenshot of one embodiment of a card link screen displayed on the card user computer system. The card link screen is used to link a payment card to the rewards program.

FIG. 8 shows one example of the card link screen 156 on the card user computing device 128. The card link screen 156 includes a card nickname input box 158, a card number input box 160, and a link card button 162. The card link screen 156 also displays the amount of reward credits 176 the card user 104 has earned as part of the rewards program 102. In some embodiments, the amount of reward credits 176 can be displayed on a majority or all the screens of the card user's 104 rewards account.

It should be appreciated that it is not required to enter a card nickname to link the payment card 172 to the rewards program 102. However, the ability to label the payment card 172 with a nickname can help distinguish the payment card 172 from other payment cards linked to the rewards program 102. The card nickname is one type of additional payment card information the card user 104 can optionally provide as part of linking the payment card 172 to the reward program 102. It should be appreciated that the card user 104 can also provide other payment card information such as the expiration date of the payment card 172, the name on the payment card 172, the security code (CCV code) of the payment card 172, the zip code of the billing address for the payment card 172, or the like.

In a preferred embodiment, the only information required to link the payment card 172 to the rewards program 102 is the card number. There is no requirement to submit any of the other information associated with the payment card 172. This can put the card user 104 at ease knowing that the card number by itself is generally insufficient to allow third parties to make unauthorized purchases. This also reduces the security risk associated with storing the payment card information in the rewards platform computing system 112.

Referring to FIG. 7, at step 150, the card user 104 enters the card number of the payment card 172 in the card link screen 156 of the card user computing device 128. The card user 104 can also enter a nickname for the payment card 172. At step 152, the card user 104 presses the link card button 162, and the card user computing device 128 sends one or more files 124 (e.g., one or more payment card setup files) containing the payment card information to the rewards platform computing device 126.

At step 154, the rewards platform computing device 126 receives the one or more files 124 containing the payment card information from the card user computing device 128. The rewards platform computing device 126 associates the card number of the payment card 172 with the account of the card user 104. It also stores the card number and other payment card information along with any card user information in the one or more rewards platform databases.

At step 155, the rewards platform computing device 126 sends one or more files 124 to the card user computing device 128. The one or more files 124 can be opened on the card user computing device 128 to display a confirmation screen 164 indicating that the payment card 172 has been successfully linked to the rewards program 102.

Figure 9:
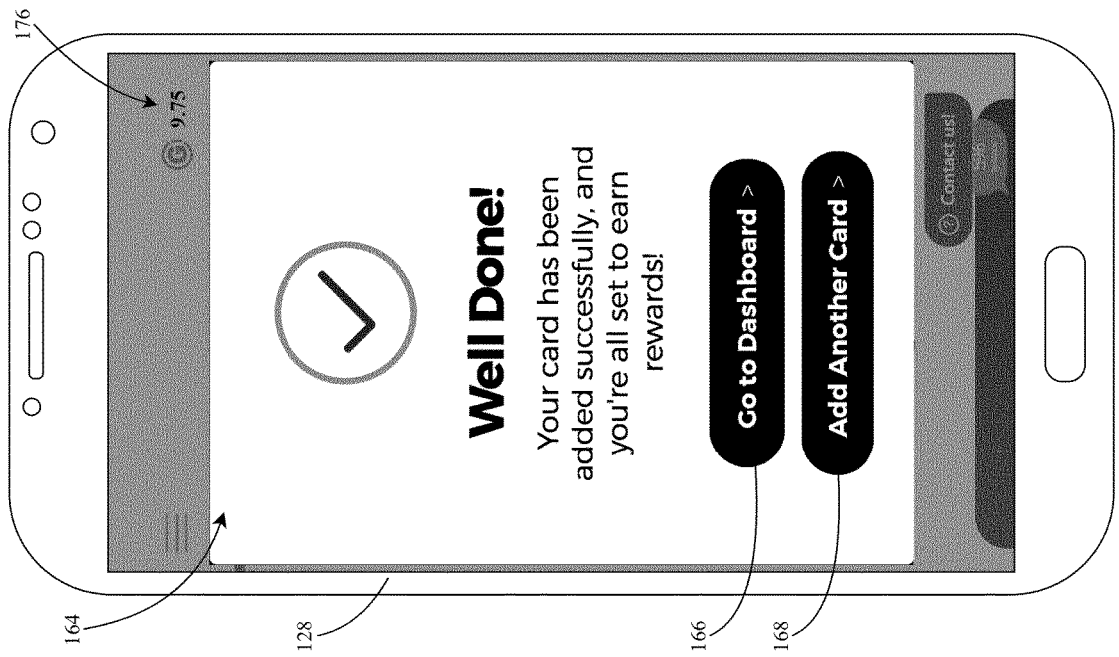
FIG. 9 show a screenshot of one embodiment of a confirmation screen displayed on the card user computer system. The confirmation screen indicates that the payment card has been successfully linked to the rewards program.

FIG. 9 shows one example of the confirmation screen 164 on the card user computing device 128. The confirmation screen 164 displays a graphical indicator and/or text indicating to the card user 104 that the payment card 172 has been successfully linked to the rewards program 102. The confirmation screen 164 also displays a button 166 that when pressed takes the card user 104 to a card user dashboard screen 170. It also displays a button 168 that when pressed takes the card user 104 to the card link screen 156 to link another payment card to the rewards program 102.

Figures 10, 11:
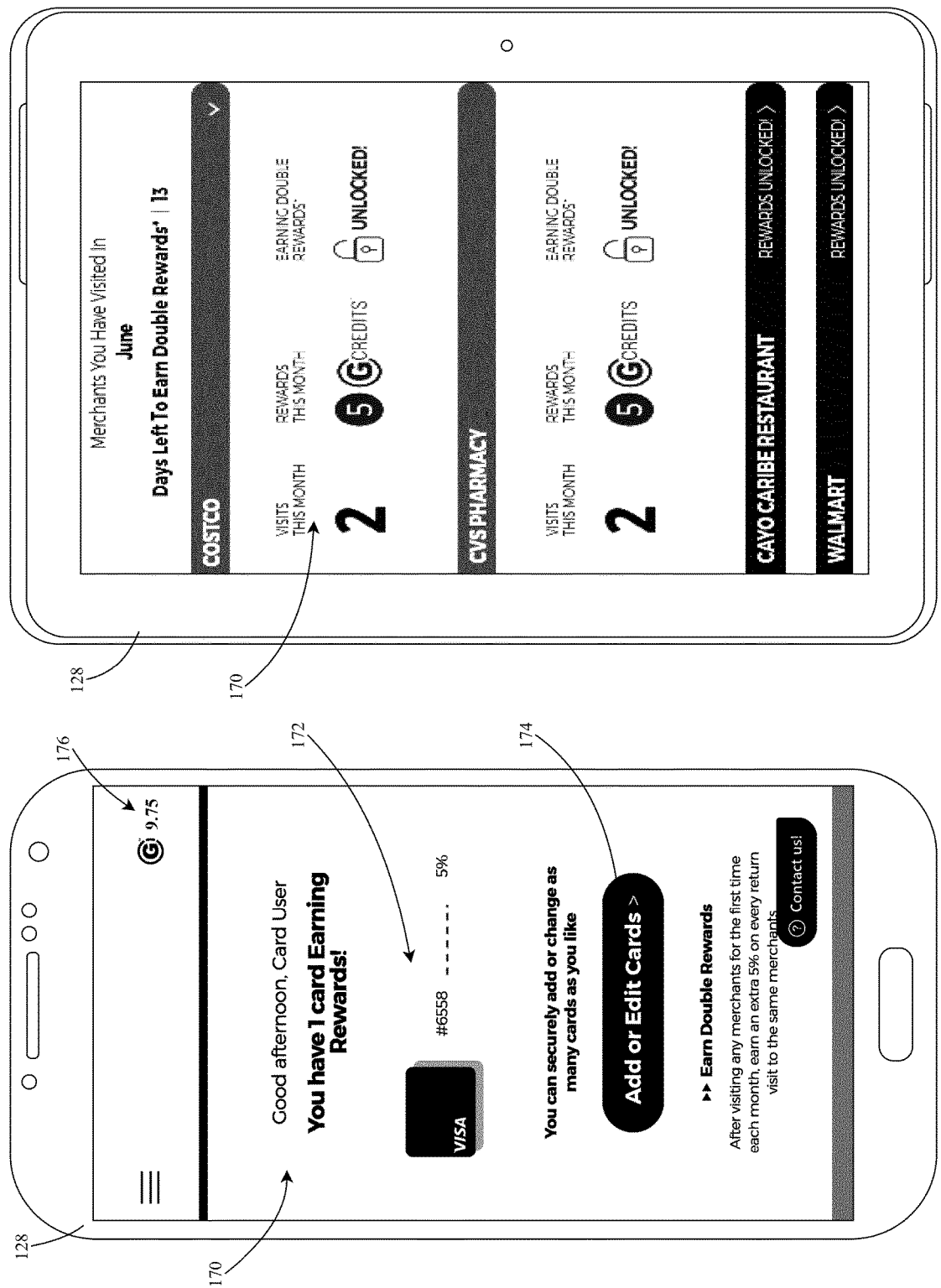
FIG. 10 show a screenshot of one embodiment of a card user dashboard screen displayed on the card user computer system. The card user dashboard screen lists the payment cards linked to the rewards program.
FIG. 11 show a screenshot of another embodiment of the card user dashboard screen displayed on the card user computer system. The screen shows information about boosted reward credits.

FIG. 10 shows one example of the card user dashboard screen 170 on the card user computing device 128. The card user dashboard screen 170 displays a list of linked payment cards. FIG. 10 only shows the payment card 172 because it is the only payment card the card user 104 has linked to the rewards program 102. However, if the card user 104 links one or more additional cards to the rewards program 102 they will be shown on the user dashboard screen 170. The card user dashboard screen 170 also includes a button 174 that the card user 104 can press to add additional payment cards or edit the payment card 172.

It should be appreciated that the card user 104 can link multiple payment cards to the card user's account in the rewards program 102. This makes it possible for the card user 104 to earn reward credits 176 for qualified transactions made with any of the payment cards in the card user's account and linked to the rewards program 102.

It should be appreciated that the card user 104 only needs to link payment cards to the card user's account in the rewards program 102 one time in order to begin earning rewards. This makes it possible for the card user 104 to earn reward credits 176 for qualified transactions made with any of the payment cards in the card user's account and linked to the rewards program 102 without additional action required.

It should be appreciated that the payment card 172 can be any suitable type of card and have a variety of physical or virtual manifestations. For example, the payment card 172 can be a credit card affiliated with a payment card association (also referred to as a payment card network) such as Visa, MasterCard, American Express, Discover, or the like. The payment card 172 can also be a credit card that is not affiliated with a payment card association. The payment card 172 can also be a debit card or gift card that may or may not be affiliated with a payment card association.

The payment card 172 can be in the form of a physical card that the card user 104 can present at the point of sale. The payment card 172 can also be a virtual card where the payment card information is stored electronically on a computing device such as a mobile phone, computer, or the like. Examples of virtual payment cards include those stored in or provided by Apple Pay, Google Pay, certain intermediate payment processors, and the like.

In some embodiments, the card user dashboard screen 170 can also display additional information about ways the card user 104 can increase the amount of reward credits 176 earned for each qualified transaction as well as information about the status of the card user's ability to earn boosted reward credits. The information about ways to increase reward credits can be provided below the list of linked payment cards on the card user dashboard screen 170. The card user 104 can access it by scrolling down on the screen of the card user computing device 128.

FIG. 11 shows one example of the card user dashboard screen 170 on a tablet computing device 128 with the screen scrolled down to show information about ways to boost the amount of reward credits 176 earned for each qualified transaction. The card user dashboard screen 170 shows that the card user has visited both Costco and CVS Pharmacy twice in the first half of the month and has unlocked the ability to earn double reward credits for qualified transactions made at those merchants for the rest of the month (over the next 13 days).

It should be appreciated that there are a variety of factors that can qualify the card user 104 for increased reward credits 176 for a qualified transaction. For example, the card user 104 can be given an increased amount of reward credits 176 for using a certain type of payment card 172. In some embodiments, the card user 104 the amount of reward credits 176 is increased for using a payment card 172 that charges lower fees such as a debit card, gift card, or the like compared to a payment card 172 that charges higher fees such as a credit card affiliated with a payment card association.

In some embodiments, the amount of reward credits 176 can be increased by an additional 1-15% or 2-10% for using a debit card instead of a credit card. For example, if the amount of reward credits 176 given for a qualified purchase made with a credit card is 5%, then the reward credits 176 for a purchase made with a debit card can be 7%.

The amount of reward credits 176 given to the card user 104 can also be increased the more the card user 104 participates in the rewards program 102 and/or makes qualified purchases. For example, in some embodiments, the amount of reward credits 176 can be increased (1-35%) for visiting the same merchant multiple times (2-10 times) in a defined time period (e.g., week, month, year). For example, the card user 104 can be given reward credits 176 of 5% of a qualified purchase for the first visit and 10% of a qualified purchase for each subsequent visit during the defined time period. The amount can be increased in a single step or in multiple steps over the defined time period—e.g., 5% reward credits for first visit, 7% reward credits for second visit, and 10% reward credits for third visit.

In some embodiments, the amount of reward credits 176 can be increased (1-30%) when the card user 104 reaches certain spending thresholds (e.g., $100-$5,000) over a defined time period (e.g., week, month, year). For example, the card user 104 can be given reward credits 176 according to the following schedule: 5% reward credits for each qualified purchase made before the total amount purchased exceeds $200 in the defined time period, 7% for each qualified purchase made before the total amount purchased exceeds $400 in the defined time period, 10% for each qualified purchase made for the remainder of the defined time period.

The amount of reward credits 176 can also be increased based on the number of additional users the card user 104 refers to the rewards program 102. For example, the amount of reward credits 176 given to the card user 104 for each qualified purchase can be increased 1-35% for each new user the card user 104 refers to the rewards program 102. The increased amount of reward credits 176 can expire after a set amount of time (e.g., 1-36 months) or can never expire. In some embodiments, the card user 104 can earn a permanent increase in the amount of reward credits 176 for referring a threshold number of new users (25-500) to the rewards program 102.

The amount of reward credits 176 can also be increased based on whether the payment card 172 is sponsored by, affiliated with, or issued by the rewards program 102. For example, the use of such a payment card 172 can increase the amount of reward credits given to the card user 104 for a qualified transaction by an additional 1-15% or 2-10%. For example, if the amount of reward credits 176 given for a qualified purchase made with a regular payment card is 5%, then the reward credits 176 for using a rewards program sponsored payment card can be 7%.

In a preferred embodiment, the reward credits 176 are given for the full amount of each qualified purchase without reducing them to account for things such as taxes, tips, or the like. It should be appreciated, however, that in other embodiments the amount of reward credits 176 can be reduced to an amount less than the full amount of each qualified purchase. For example, the reward credits 176 can be given for only the portion of the qualified purchase before adding taxes, tips, or the like.

In some embodiments, the reward credits 176 are denominated in a manner that is roughly on par with the value of the local currency—e.g., U.S. dollar, euro, yen, or the like. For example, if the amount of reward credits 176 earned for each qualified purchase is 5% and the card user 104 makes a qualified purchase of $100, then the card user 104 receives 5 reward credits 176. This makes it easy for the card user 104 to understand the value of each reward credit 176. The card user 104 understands the value and purchasing power of the local currency. Tying the approximate value of the reward credits 176 to the value of the local currency, gives the card user 104 an easy and intuitive way to value the reward credits 176.

FIG. 12 shows a block diagram of one embodiment of the rewards platform computing system 112 communicatively linked to the merchant platform computing system 116. The merchant platform computing system 116 includes one or more merchant computing devices 178, which can be any suitable computing devices such as, for example, one or more of the computing devices 101. The computing systems 112, 116 can share digital information with each other in the form of data or files 180 either directly or by way of one or more intermediate computing platforms or devices (e.g., the Internet).

The merchant computing devices 178 are shown in FIG. 12 as a desktop computer and a server. However, it should be appreciated that the merchant platform computing system 116 can use other merchant computing devices 178 to communicate with the rewards platform computing system 112. For example, the merchant platform computing system 116 can use a laptop computer, mobile phone, tablet, payment input device, or the like, to communicate with the rewards platform computing system 112.

The rewards platform computing system 112 and the merchant platform computing system 116 can communicate with each other in a variety of ways. In some embodiments, the rewards platform computing system 112 includes one or more files 180 that can be retrieved by and displayed on the merchant computing devices 178. For example, the one or more files 180 can be displayed as a web page on the merchant computing devices 178. In some embodiments the merchant computing devices 178 can include an app or other software that directly access is the one or more files 180 from the rewards platform computing system 112.

FIG. 13 shows a flowchart of one embodiment of a process by which the merchant 106 can sign up for the rewards program 102. At step 182, the merchant 106 uses the merchant computing device 178 to request one or more files 180 from the rewards platform computing device 126. The one or more files 180 can be opened on the merchant computing device 178 with software such as a web browser or mobile app to display a merchant sign-up screen 190.

At step 184, the merchant 106 enters merchant information into the merchant sign-up screen 190 on the merchant computing device 178. Merchant information can include things such as details about the business (e.g., legal and trade names, address, phone number, and the like) financial information (e.g., merchant bank account from which fees owed under the rewards program 102 can be debited), and the like.

As part of signing up to participate in the rewards program 102, the merchant 106 authorizes the rewards program 102 to directly debit any amounts owed under the rewards program 102 from the merchant's bank account using a direct debit provider such as an automated clearing house (ACH) service. The merchant 106 can do this in a variety of ways. In some embodiments, the merchant 106 downloads and completes a direct debit authorization form and then uploads the completed form to the rewards platform computing system 112 as part of the sign-up process.

Figures 15, 16:
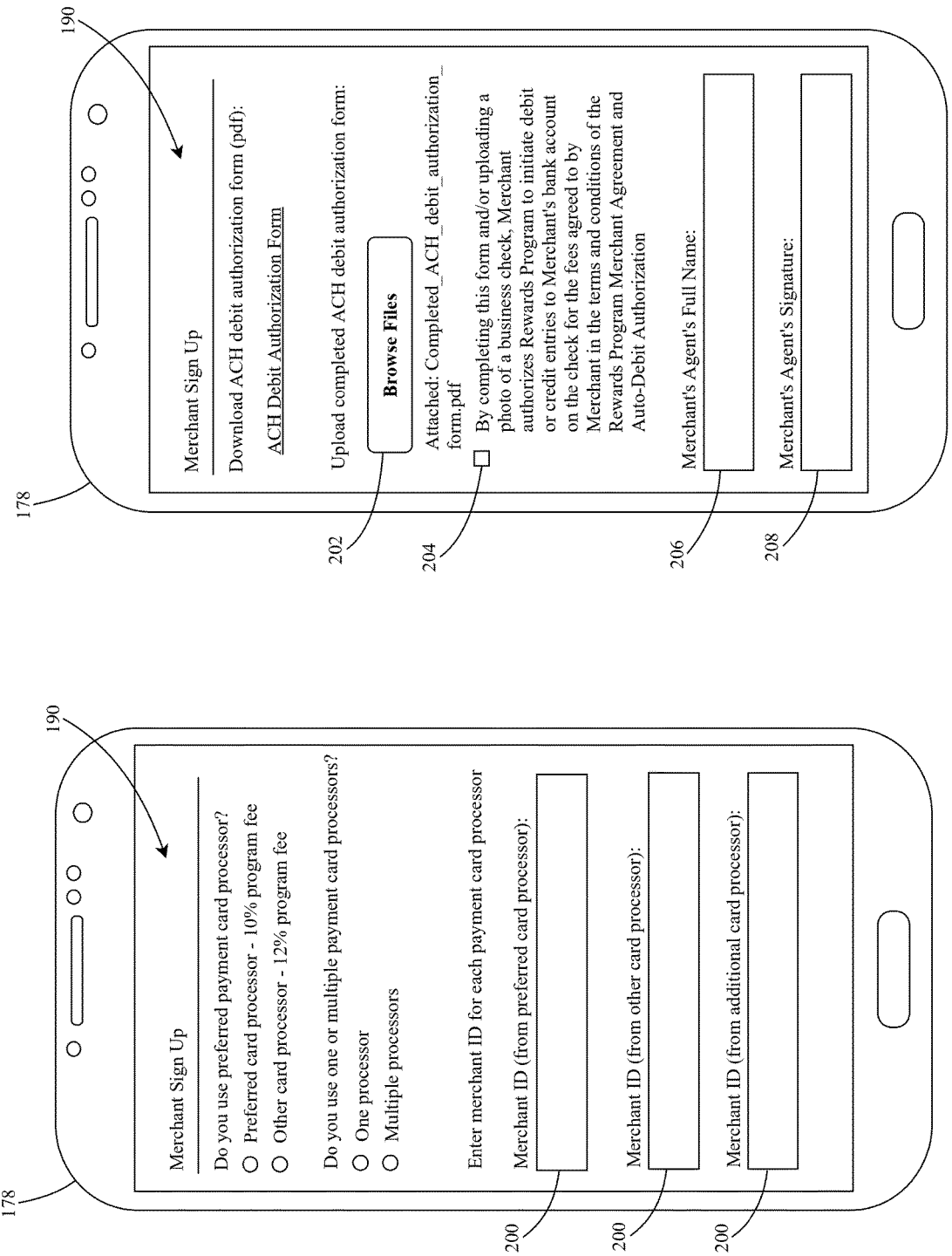

FIGS. 14-16 show one example of the merchant sign-up screen 190. FIG. 14 shows the top of the merchant sign-up screen 190; FIG. 15 shows the middle; and FIG. 16 shows the bottom. The merchant sign-up screen 190 is used to collect the merchant information and send it to the merchant platform computing system 112 in one or more files 180 (e.g., one or more merchant setup files). As shown in FIG. 14, the top of the merchant sign-up screen 190 includes a business trade name input box 192, a business legal name input box 194, a business physical address input box 196 and a business phone number input box 198.

In FIG. 15, the merchant 106 enters information about the payment card processor used by the merchant 106. This information is used by the rewards program 102 to track and identify qualified purchases made by the card user 104. The payment card processor operates as the payment card transaction reporter 108 and reports qualified payment card transactions to the rewards program 102. It should be appreciated that although the merchant sign-up screen 190 shows the payment card processor as the payment card transaction reporter 108, in other embodiments, any other suitable entity can be the payment card transaction reporter 108.

In some embodiments, the rewards program 102 may charge discounted fees to the merchant 106 for qualified transactions made by the card user 104 depending on the identity of the payment card transaction reporter 108. For example, some payment card transaction reporters 108 may charge lower transaction fees or have a special arrangement or agreement with the rewards program 102 making it less costly to track and report qualified payment card transactions. The lower costs make it possible for the rewards program 102 to offer a discount on the fees owed by the merchant 106 (e.g., the percentage of the qualified transaction) for participating in the rewards program 102.

Referring to FIG. 15, the merchant 106 selects whether it is using a preferred payment card processor or a different non-preferred payment card processor. If the merchant 106 is using a preferred payment card processor, then the merchant 106 pays a discounted program fee of 10% of each qualified payment card transaction to the rewards program 102. However, if the merchant 106 is using a non-preferred payment card processor, then the merchant 106 pays an undiscounted program fee of 12% of each qualified payment card transaction.

It should be appreciated that the rewards program 102 can charge a program fee to the merchant 106 that varies widely. For example, in some embodiments, the rewards program 102 can charge the merchant 106 a program fee of 2-40%, 4-30%, or 5-20%. It should also be appreciated that the program fee can be calculated based on the full amount of each payment card transaction (e.g., includes taxes, tips, and the like) or on a reduced amount of each payment card transaction (e.g., does not include taxes, tips, or the like).

Referring to FIG. 15 again, the merchant 106 also indicates whether it is using a single payment card processor or multiple payment card processors. The merchant 106 enters each merchant identifier by which the merchant 106 is known to each payment card processor in the merchant ID input boxes 200. The merchant identifier is used by the payment card transaction reporter 108 to identify qualified payment card transactions and report them to the rewards program 102.

In FIG. 16, the merchant 106 authorizes the rewards program 102 to directly debit the merchant's bank account for any fees owed under the rewards program 102. The merchant 106 does this by downloading a PDF copy of a direct debit authorization form, filling it out, and uploading it using the browse files button 202. The merchant 106 fills the form with the required information and signs it before uploading. The required information can include details about the merchant 106 and/or the merchant's bank account such as the account number, routing number, or the like. The merchant 106 also checks the box 204 agreeing to allow direct debit of fees owed under the rewards program 102.

With the merchant's one-time authorization, the rewards program operator can direct debit any amounts owed under the rewards program 102 directly from the merchant's bank account using a direct debit provider. A direct debit provider such an automated clearing house (ACH) service in the U.S. is an entity that facilitates direct debit or direct withdrawal payments. A direct debit or direct withdrawal is a financial transaction in which the rewards program 102 withdraws funds from the merchant's bank account. The rewards program 102 instructs its bank to collect (i.e., debit) an amount directly from the merchant's bank account and transfer those funds into a bank account designated by rewards program 102.

The merchant 106 authorizes its bank to allow the rewards program 102 to direct debit the merchant's bank account.

This can be referred to as the pre-authorized debit (PAD) or pre-authorized payment (PAP). After the direct debit is authorized in advance, the direct debit transactions can be processed electronically.

A direct debit instruction differs from a direct deposit and standing order instruction, which are initiated by the payer. A standing order involves fixed payment amounts paid periodically, while a direct debit can be any amount and can be casual or periodic. An example of a direct debit system is the automated clearing house (ACH) network in the United States. The ACH network can be used for direct debits as well as other transactions such as credit transfers An agent authorized to act on behalf of the merchant 106 enters his/her full name in the input box 206 and electronically signs the form in the input box 208. Referring to FIG. 13, at step 186, the merchant 106 presses the submit button (not shown) on the merchant signup screen 190 and sends one or more files 180 (aka merchant setup file(s)) containing the merchant information to the rewards platform computing device 126.

At step 188, the rewards platform computing device 126 receives the one or more files 180 from the merchant computing device 178 where the merchant information including the direct debit authorization is stored in the one or more rewards platform databases.

The merchant's application to participate in the rewards program 102 is reviewed by the rewards platform computing system 112 and/or forwarded to the rewards program operator to review and approve. Once approved, the merchant 106 can begin participating in the rewards program 102.

It should be appreciated that the merchant 106 can sign up for the rewards program 102 in a variety of other ways as well. For example, in some embodiments, the merchant 106 can print an application, fill it out, and mail it to the rewards program operator. In some embodiments, the merchant 106 can travel to the location of the rewards program operator and sign up for the rewards program 102.

In some embodiments, the rewards program computing system 112 can be configured to send one or more files 180 to the merchant computing device 178 that are used to display a merchant dashboard 210 using a web browser or other software such as, for example, a mobile app. The merchant dashboard 210 can show a variety of analytics information about the merchant's participation in the rewards program 102.

Figure 18:
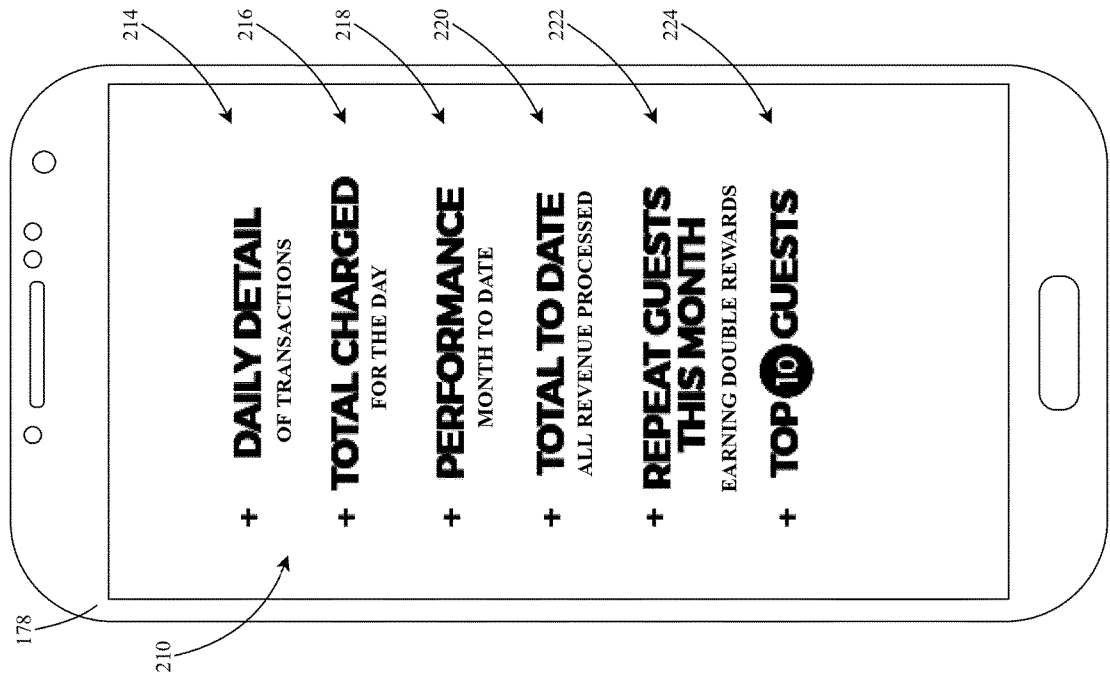
FIGS. 17-21 show screenshots of one embodiment of a merchant dashboard displayed on the merchant computing device.
Figure 17:
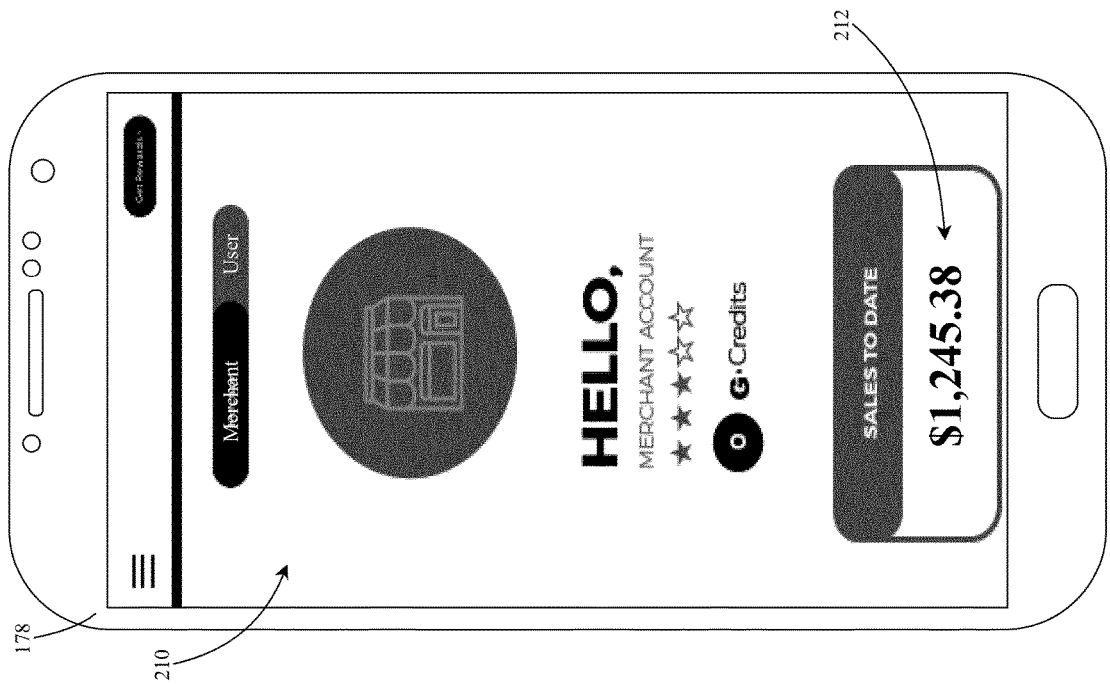

FIGS. 17-18 show screenshots of one embodiment of the merchant dashboard 210. FIG. 17 shows the top of the merchant dashboard 210, and FIG. 18 shows the bottom of the merchant dashboard 210. As shown in FIG. 17, the top of the merchant dashboard 210 can include a greeting for the merchant 106 and display the total amount of qualified purchases 212 made by card users in the rewards program in the current reporting period (e.g., week, month, bi-month, year, etc.).

The bottom of the merchant dashboard 210 can include a number of collapsible menus that can be expanded to show the following information: daily transaction details 214, total charged for the day 216, month to day performance 218, all revenue processed to date 220, repeat guests this month 222, and top ten guests 224.

Figure 20:
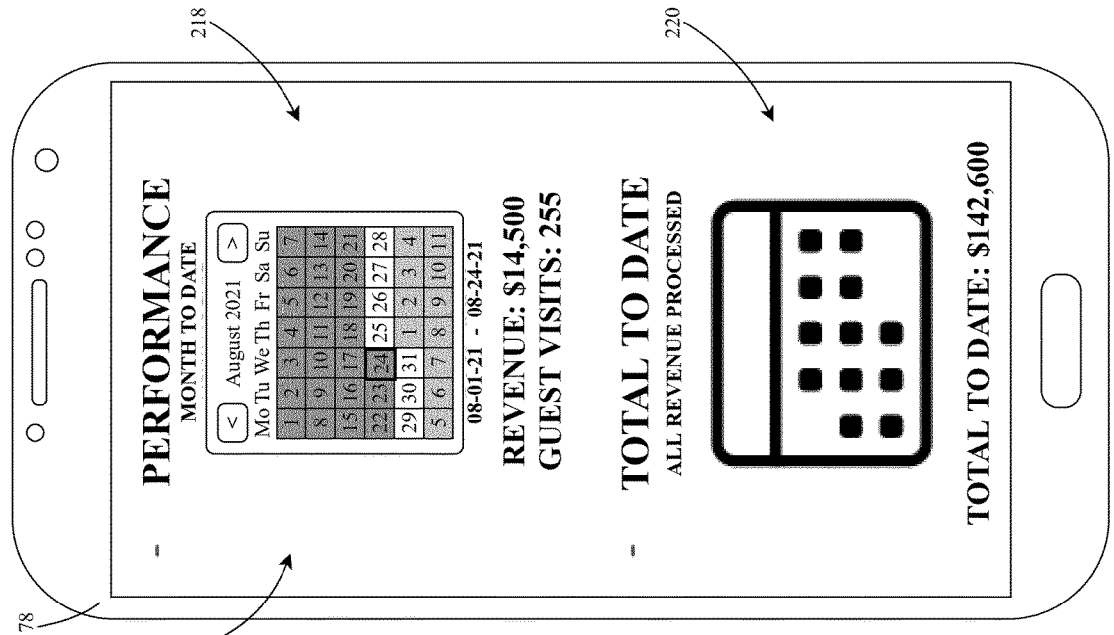
Figure 19:
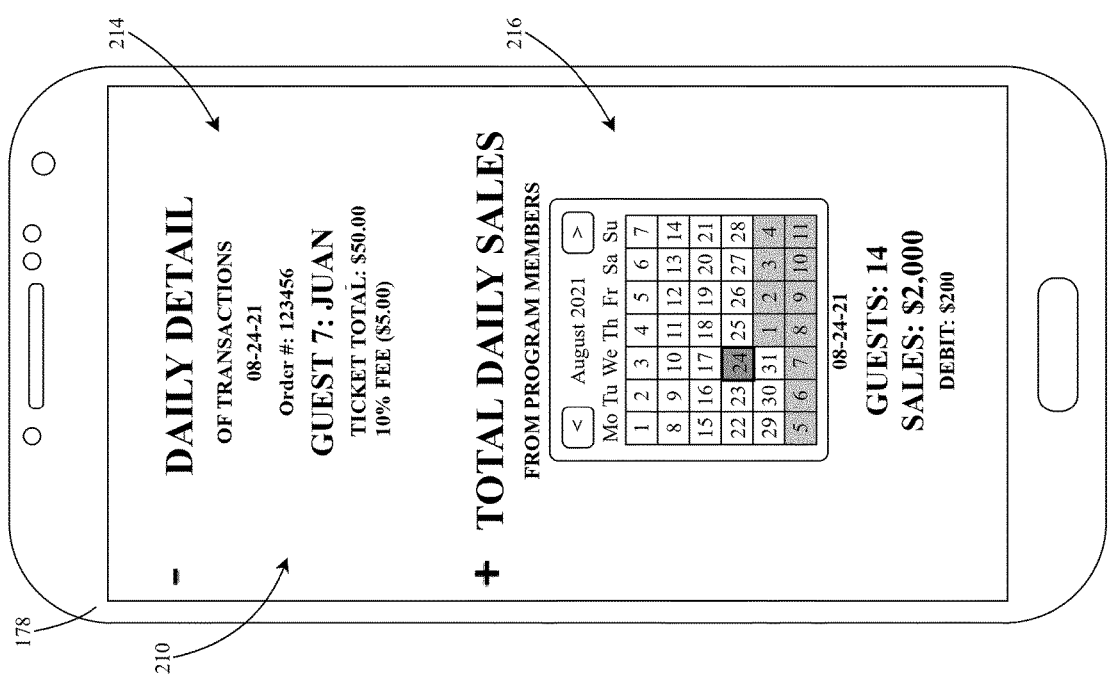
Figure 21:
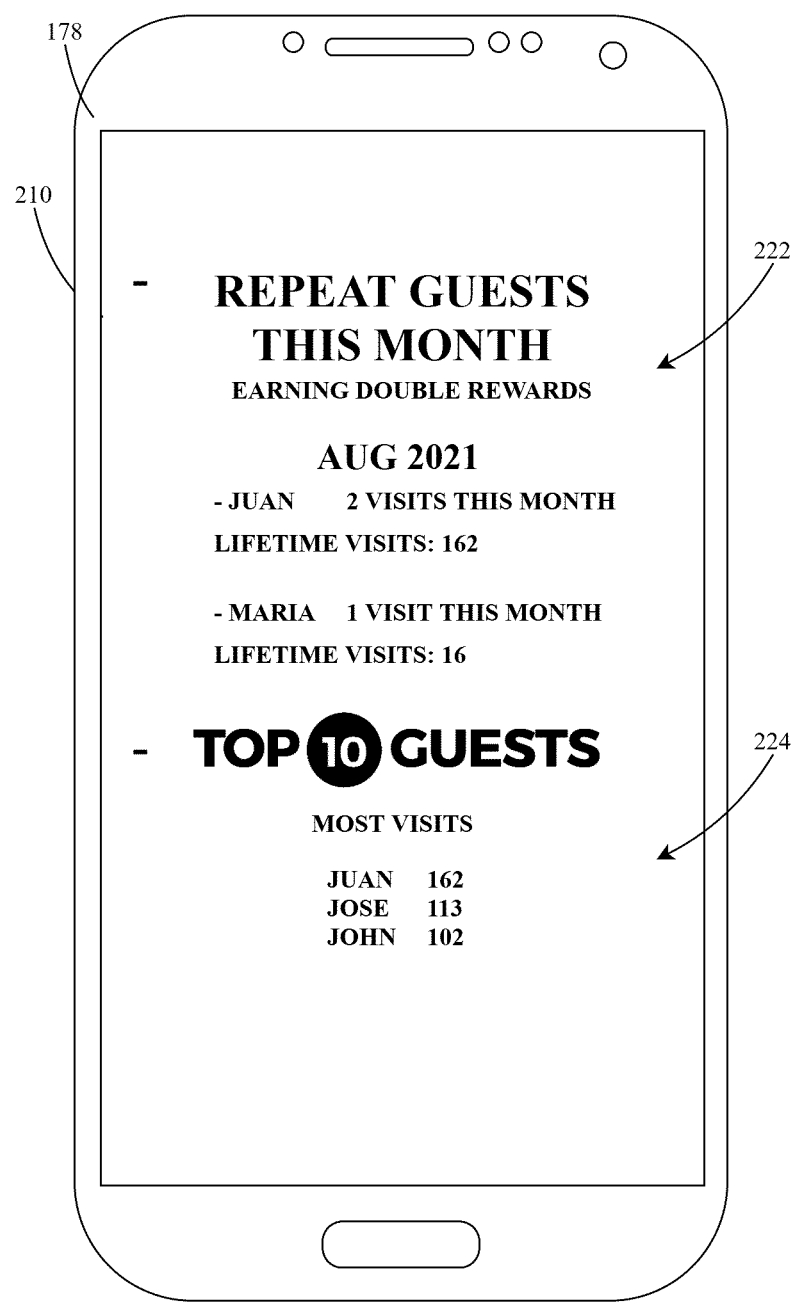

FIGS. 19-21 show the menus in the expanded state. Referring to FIG. 19, the daily transaction details 214 show that on 24 Aug. 2021 guest #7 ordered a total of $50, and the merchant 106 owes a fee of $5 to the rewards program 102. The total daily sales 216 show that on 24 Aug. 2021 fourteen guests ordered made $2000 of qualified transactions, and the merchant 106 owes a fee of $200 to the rewards program 102.

Referring to FIG. 20, the month to date performance 218 shows that 255 card users in the rewards program 102 have visited the merchant 106 and made $14,500 in qualified purchases. The total of all revenue processed to date 220 shows that card users in the rewards program 102 have made $142,600 in qualified transactions since the merchant 106 joined.

Referring to FIG. 21, the repeat guests for the current month 222 shows a list of card users that have made repeat visits to the merchant 106 this month. It also shows the number of lifetime visits each card user has made to the merchant 106. The top ten guests 224 shows a list of the card users who have visited the merchant 106 the greatest number of times since the merchant 106 joined the rewards program 102.

It should be appreciated that the merchant dashboard 210 can have a variety of configurations beyond the configuration shown in FIGS. 17-21. For example, the merchant dashboard 210 can show additional information about the performance of the merchant 106 in the rewards program 102 such as charts showing the change in the number and/or amount of qualified payment card transactions over time.

In some embodiments, the merchant dashboard 210 or some other form of reporting system (e.g., email reports, etc.) can be used to show the merchant 106 a comparison of total sales revenue overall and/or from rewards program participants before and after the merchant entered the rewards program. In this way, the merchant 106 is shown data and/or evidence establishing the effect the rewards program is having on sales revenue. The sales revenue can be shown in the form of graphs such as bar graphs with the two periods compared side by side or in any other suitable format that is easy to understand.

Figure 22:
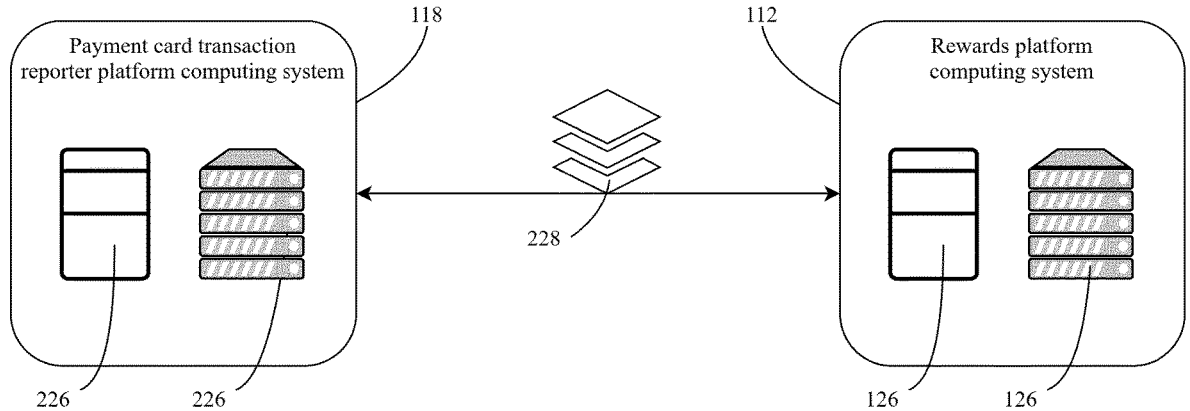
FIG. 22 is a block diagram of one embodiment of a rewards platform computing system communicatively linked with a payment card transaction reporter platform computing system.

FIG. 22 shows a block diagram of one embodiment of the rewards platform computing system 112 communicatively linked to the payment card transaction reporter platform computing system 118. The payment card transaction reporter platform computing system 118 includes one or more payment card transaction reporter computing devices 226, which can be any suitable computing devices such as, for example, one or more of the computing devices 101. The computing systems 112, 118 can share digital information with each other in the form of data or files 228 either directly or by way of one or more intermediate computing platforms or devices (e.g., the Internet).

The payment card transaction reporter computing devices 226 are shown in FIG. 22 as a desktop computer and a server. However, it should be appreciated that the payment card transaction reporter platform computing system 118 can use other payment card transaction reporter computing devices 226 to communicate with the rewards platform computing system 112. For example, the payment card transaction reporter platform computing system 118 can use a laptop computer, tablet, or the like to communicate with the rewards platform computing system 112.

The rewards platform computing system 112 and the payment card transaction reporter platform computing system 118 can communicate with each other in a variety of ways. In some embodiments, the rewards platform computing system 112 and the payment card transaction reporter platform computing system 118 can communicate with each other by exchanging the one or more files 228 using a standardized input/output interface such as an application programming interface.

Figure 23:
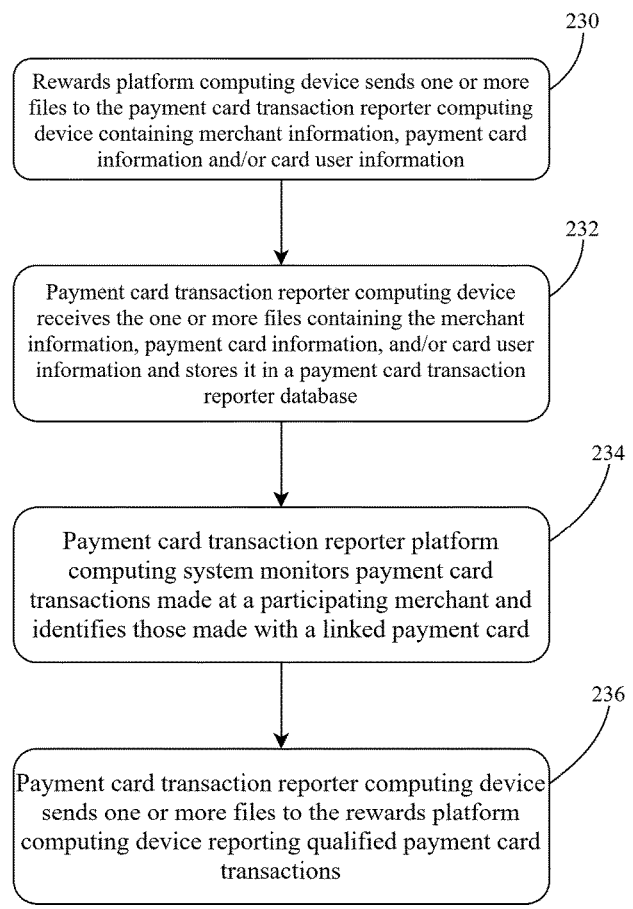
FIG. 23 is a flowchart of one embodiment of a process for sending various information from the rewards platform computing system to the payment card transaction reporter platform computing system.

FIG. 23 shows a flowchart of one embodiment of a process for sending merchant information, payment card information, and/or card user information from the rewards platform computing system 112 to the payment card transaction reporter platform computing system 118. The payment card transaction reporter 108 uses this information to identify qualified transactions made at the merchant 106 and report them to the rewards platform computing system 112.

It should be appreciated that any suitable amount of merchant information, payment card information, and/or card user information can be sent to the payment card transaction reporter platform computing system 118. In some embodiments, the rewards platform computing system 112 sends at least the payment card number and the merchant identifier to the payment card transaction reporter platform computing system 118. In some embodiments, the rewards platform computing system 112 can also send additional information such as a card user ID, merchant name, or the like, to the payment card transaction reporter platform computing system 118.

Referring to FIG. 23, at step 230, the rewards platform computing device 126 sends the one or more files 228 to the payment card transaction reporter computing device 226. The one or more files 228 can contain the merchant information, the payment card information, and/or the card user information.

In some embodiments, the one or more files 228 includes a card number file containing one or more card numbers of linked payment cards. In some embodiments, the one or more files 228 includes a merchant file containing one or more merchant identifiers (e.g., merchant identification numbers used by the payment card transaction reporter to identify merchants) for merchants participating in the rewards program 102. The card number file and/or the merchant file can also include any of the other information exchanged between the computing systems 112, 118.

Returning to FIG. 23, at step 232, the payment card transaction reporter computing device 226 receives the one or more files 228 from the rewards platform computing device 126 and stores the information in the file(s) 228 in a payment card transaction reporter database. At step 234, the payment card transaction reporter platform computing system 118 monitors payment card transactions made at the merchant 106 and identifies those made with a linked payment card. In this way, the payment card transaction reporter 108 can identify payment card transactions made using linked payment cards at participating merchants (i.e., qualified payment card transactions).

At step 236, the payment card transaction reporter computing device 226 sends one or more files 228 (also known as qualifying transaction file(s)) to the rewards platform computing device 126. The one or more files 228 include information about qualified transactions made at merchants participating in the rewards program 102. In some embodiments, the one or more files 228 include sufficient information to allow the rewards program operator to give card users reward credits and charge participating merchants 106 the program fee.

In some embodiments, the one or more files 228 include payment card transaction information for each qualified transaction. This can include information identifying the merchant 106 (e.g., merchant identifier) and the card user 104 (e.g., card user identifier, payment card number, etc.) involved in the payment card transaction as well as the gross amount of the payment card transaction and/or net amount of the payment card transaction (without taxes and/or tip). Their rewards platform computing system 112 gives each card user 104 reward credits 176 for each qualified transaction and updates each card user's account accordingly.

It should be appreciated that the payment card transaction reporter 108 can be any entity that receives payment card transactions from a participating merchant 106. Examples of such entities include a payment card processor, a payment card association, or a manufacturer or operator of a payment input device (e.g., payment card terminal or payment gateway), or the like.

In some embodiments, the payment card transaction reporter 108 is a payment card processor. The term payment card processor is used broadly to include traditional payment processors and payment gateways. In general, these are entities appointed by the merchant 106 to handle transactions from various channels such as credit cards, debit cards, gift cards, mobile payment apps, and the like. The term payment card processor shall not be interpreted to include payment card associations such as Visa, MasterCard, American Express, Discover, and the like.

Figure 24:
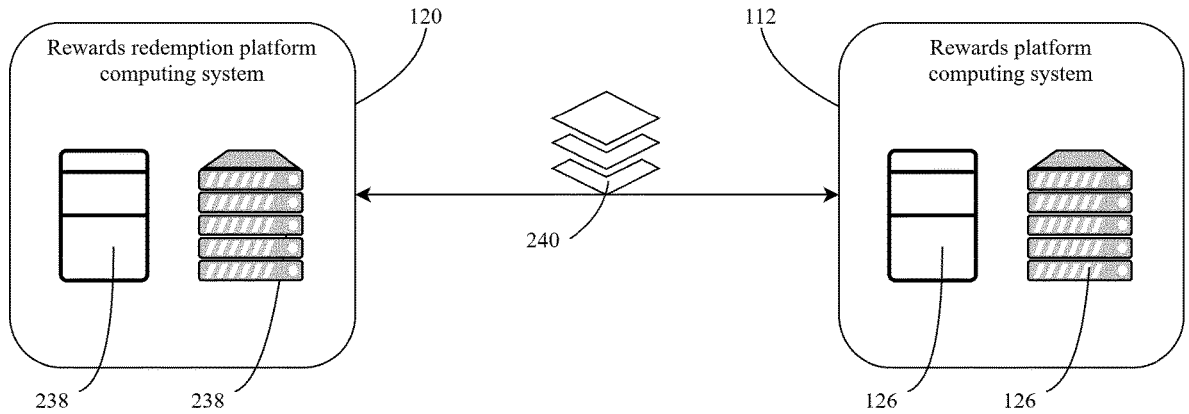
FIG. 24 is a block diagram of one embodiment of a rewards platform computing system communicatively linked with a rewards redemption platform computing system.

FIG. 24 shows a block diagram of one embodiment of the rewards platform computing system 112 communicatively linked to the rewards redemption platform computing system 120. The rewards redemption platform computing system 120 includes one or more rewards redemption platform computing devices 238, which can be any suitable computing devices such as, for example, one or more of the computing devices 101. The computing systems 112, 120 can share digital information with each other in the form of data or files 240 either directly or by way of one or more intermediate computing platforms or devices (e.g., the Internet).

The rewards redemption platform computing system 120 can be any system where the card user 104 can exchange the reward credits 176 for goods and/or services. In some embodiments, the rewards redemption platform computing system 120 is a marketplace where third parties are allowed to offer goods and/or services in exchange for the reward credits 176. For example, the rewards redemption platform computing system 120 can include a standardized input/output interface that third parties can use to offer goods and/or services on the computing system 120. Card users 104 can use the computing system 120 to redeem the reward credits 176 for the goods and/or services offered by the third parties.

In some embodiments, the rewards redemption platform computing system 120 can be a website of a merchant or the computing system at a physical location of a merchant willing to accept the reward credits 176 in exchange for goods and/or services. For example, a merchant selling sporting goods can offer them in exchange for the reward credits 176 instead of currency (or as a mixture of reward credits 176 and currency). The merchant can use a standardized input/output interface to query and debit a card user's reward credits 176 for the purchase.

In some embodiments, the rewards redemption system 110 is controlled by the rewards program operator and/or is considered part of the rewards program 102. In other embodiments, the rewards redemption system 110 can be operated by a third party that is separate from and/or not affiliated with the rewards program operator and/or the rewards program 102. In such instances, the rewards redemption platform computing system 120 can be referred to as third-party rewards redemption platform computing system. Likewise, the rewards redemption platform computing devices 238 can be referred to as third-party rewards redemption platform computing devices.

Figure 25:
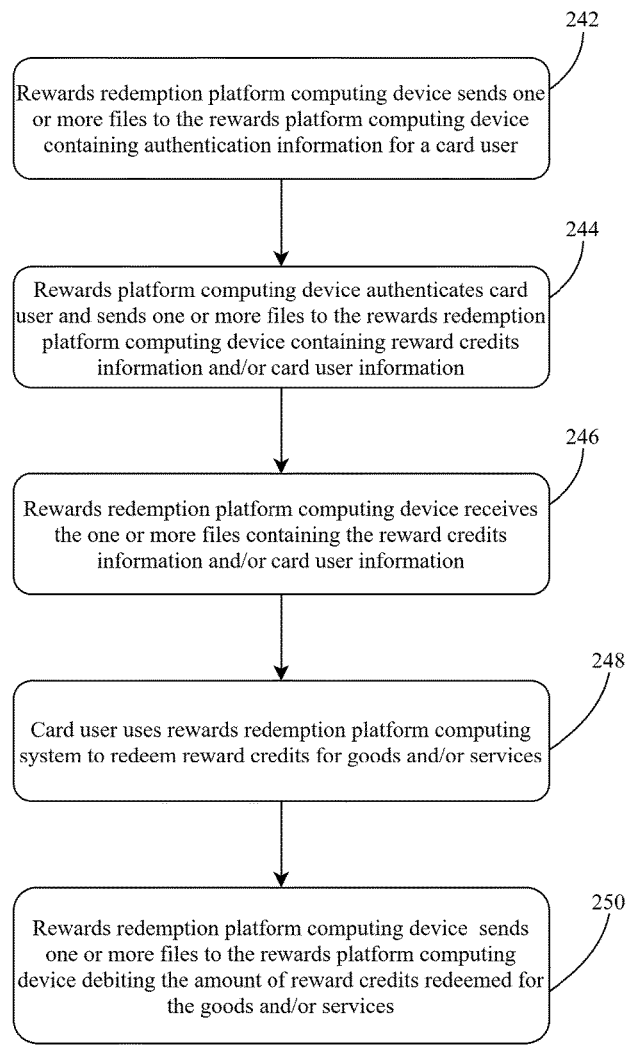
FIG. 25 is a flowchart of one embodiment of a process for enabling the rewards redemption platform computing system to redeem reward credits for goods and/or services.

FIG. 25 shows a flowchart of one embodiment of a process for enabling the rewards redemption platform computing system 120 to redeem the reward credits 176 for goods and/or services. At step 242, the rewards redemption platform computing device 238 sends one or more files 240 to the rewards platform computing device 126. The one or more files 240 contain authentication information for a card user 104. The authentication information can include a username, password, and/or any other card user information. The authentication information is used to access the card user's account on the rewards platform computing system 112.

At step 244, the rewards platform computing device 126 sends one or more files 240 to the rewards redemption platform computing device 238. The one or more files 240 contain reward credits information and/or card user information and can alternatively be referred to as the reward credits file(s). The rewards redemption platform computing system 120 uses the information in the one or more files 240 to allow the card user 104 to redeem reward credits 176 for goods and/or services.

At step 246, the rewards redemption platform computing device 238 receives the one or more files 240 containing the reward credits information and/or card user information. In some embodiments, the rewards redemption platform computing device 238 displays the amount of reward credits 176 that can be redeemed to the card user 104.

At step 248, the card user 104 uses the rewards redemption platform computing system 120 to redeem the reward credits 176 for goods and/or services. In some embodiments, this means that the card user 104 uses the reward credits 176 during the checkout process instead of currency. This would be similar to how certain payment services can be used on multiple websites to pay for goods and/or services.

At step 250, the rewards redemption platform computing device 238 sends one or more files 240 to the rewards platform computing device 126. The one or more files 240 contain instructions or information for the rewards platform computing device 126 to debit the amount of reward credits 176 redeemed by the card user 104 from the card user's account. The rewards platform computing device 126 debits the reward credits 176 from the card user 104.

The rewards program 102 pays the rewards redemption system 110 for the goods and/or services. This can be done electronically through a direct debit service provider or the like, or it can be done through an invoicing process. In some embodiments, the rewards program 102 can increase its profit margins by getting the rewards redemption system 110 to discount the goods and/or services or by controlling the value of the reward credits 176 redeemed for the goods and/or services.

In some embodiments, the rewards redemption system 110 is operated by one or more third-party entities such as one or more merchants. The rewards program operator pays the third-party entities for reward credits 176 redeemed by card users 104 minus a program fee (kept by the rewards program operator) for enabling the third-party entities to redeem reward credits 176. In some embodiments, the amount owed by the rewards program operator to the rewards redemption system 110 is paid by way of an automated daily deposit using a direct credit service such as an automated clearing house service in the U.S. This can operate in the same or similar manner as the automated direct debits used by the rewards program 102 to receive payment from the merchants 106 for qualified transactions made by the card users 104 as part of the rewards program.

In some embodiments, the reward credits 176 can be earned on any form of payment linked to the program by the rewards program user—e.g., credit cards, debit cards, gift cards, mobile payment app, and the like. In this way, reward credits 176 can be earned for any transaction, regardless which payment card is used for the transaction. Advantageously, this allows earning rewards in a way that is separated from and agnostic of particular payment cards or methods.

In some embodiments, the reward credits 176 can be exchanged or redeemed for cash-back on any payment card linked by the card user—e.g., credit cards, debit cards, gift cards, mobile payment app, program issued loyalty card, and the like. In this way, any reward credits 176 earned for any transaction, regardless which payment card is used for the transaction, can be exchanged or redeemed for cash-back on any other linked payment card. Advantageously, this allows earning and redeeming rewards in a way that is separated from and agnostic of the particular payment card used for the transaction.

In some embodiments, the reward credits 176 can be exchanged or redeemed automatically to a form of payment that is readily used at participating program merchants—e.g., credit cards, debit cards, gift cards, mobile payment app, program issued payment card, and the like. In this way, any reward credits 176 earned for any transaction, regardless which payment card is used for the transaction, can be used to pay at a merchant participating in the program. Advantageously, this allows redeeming rewards in a way that is separated from and agnostic of the particular payment card used for the transaction.

In some embodiments, the card users 104 use the rewards redemption system 110 to redeem the reward credits 176 for gift cards that can be used anywhere or at a specific merchant or entity. For example, the rewards redemption system 110 can be a website that aggregates and sells physical and/or digital gift cards for various merchants, including the participating merchants 106 (or exclusively gift cards of the participating merchants 106). The card user 104 can redeem the reward credits 176 for the gift cards. The card user 104 pays for all or part of the gift card(s) with the reward credits 176 or a combination of the reward credits 176 and currency.

In some embodiments, the rewards redemption system 110 can be communicatively linked or integrated into a digital gift card system that allows for seamless exchange or redemption of reward credits 176 for digital gift cards that can be used on any global ecommerce site that accepts such cards. In this way, the rewards redemption system 110 can be used to redeem rewards on third party sites without any form of user authentication, which reduces the friction involved with redeeming the reward credits 176 and concomitantly increases their value.

In some embodiments, the reward credits 176 can be automatically exchanged or redeemed in any of the ways described above. For example, the card user can communicate to the rewards program operator a preference to have the reward credits 176 automatically exchanged or redeemed immediately upon being earned or periodically (e.g., daily, weekly, monthly, quarterly, semiannually, annually, etc.). In such a case, the reward credits 176 are automatically converted to the desired reward (e.g., cash-back to a linked payment card, credit to a rewards loyalty balance associated with a particular merchant's loyalty program, etc.).

Figure 26:
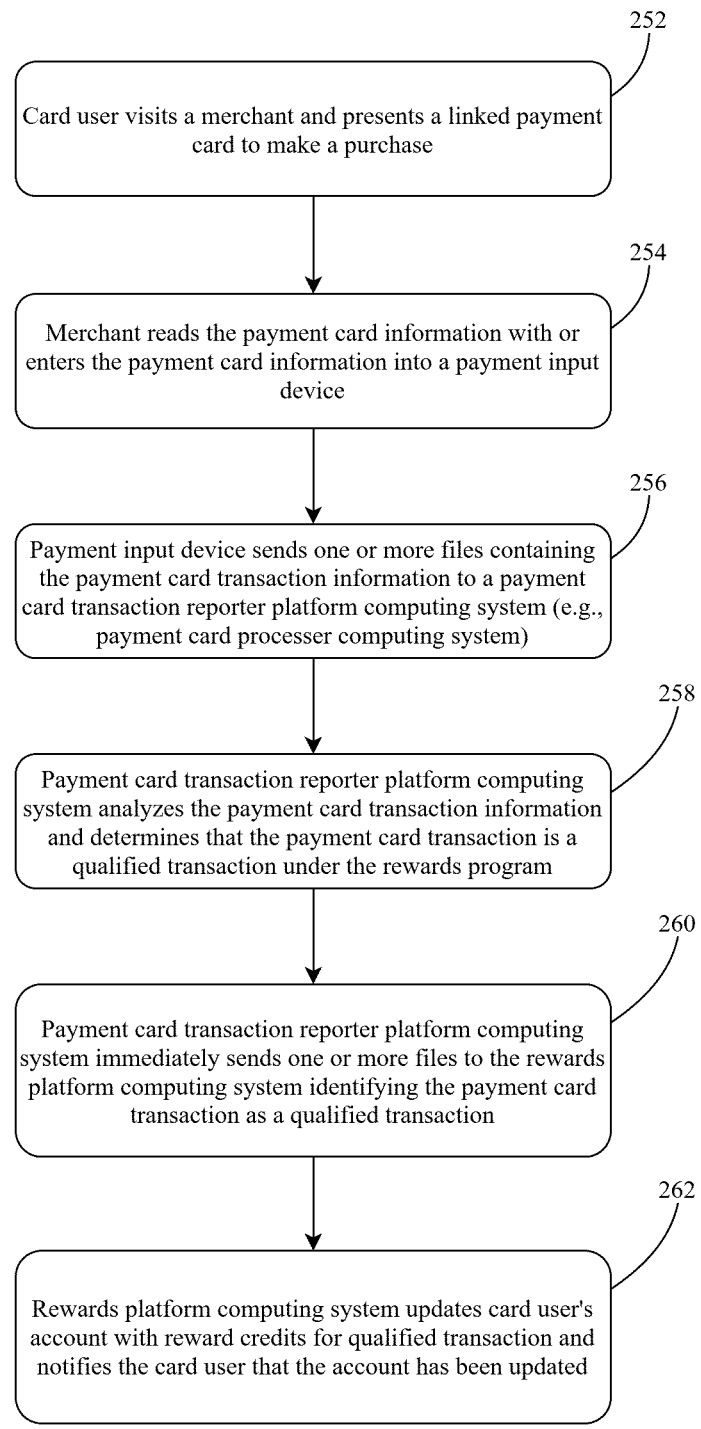
FIG. 26 is a flowchart of one embodiment of a process used by a card user to earn reward credits in the rewards program.

FIG. 26 shows a flowchart of one embodiment of a process used by the card user 104 to earn reward credits 176 in the rewards program 102. At step 252, the card user 104 visits the merchant 106 and presents a payment card that has been linked to the rewards program 102 to pay for a purchase.

At step 254, the merchant 106 reads the payment card information off the payment card with a payment input device (e.g., a payment card terminal) or enters the payment card information into the payment input device. At step 256, the payment input device sends one or more files containing the payment card transaction information to the payment card transaction reporter platform computing system 118.

At step 258, the payment card transaction reporter platform computing system 118 analyzes the payment card transaction information sent from the payment input device. The payment card transaction reporter platform computing system 118 determines that the payment card transaction is a qualified transaction under the rewards program 102.

At step 260, the payment card transaction reporter platform computing system 118 immediately sends one or more files to the rewards platform computing system 112. The one or more files include the payment card transaction information and identify the payment card transaction as a qualified transaction.

At step 262, the rewards platform computing system 112 updates the card user's account to include the reward credit 176 for the qualified transaction and the details of the payment card transaction.

Figure 27:
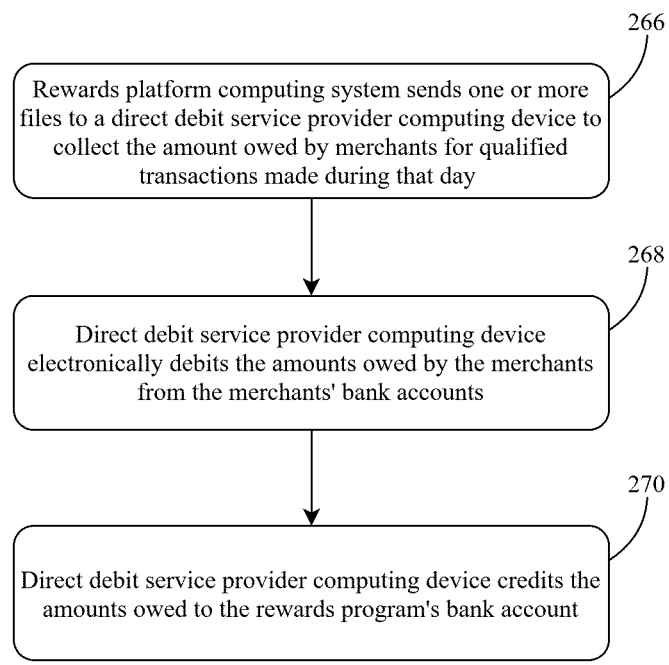
FIG. 27 is a flowchart of one embodiment of a process used by the rewards program to directly debit amounts owed by participating merchants.

FIG. 27 shows a flowchart of one embodiment of a process used by the rewards program 102 directly debit amounts owed by participating merchants. At step 266, the rewards platform computing system 112 sends one or more files (e.g., debit file(s)) to a direct debit service provider computing device. In some embodiments, the file(s) includes debit amounts for the qualified transactions made at participating merchants 106 over a one-day period.

At step 268, the direct debit service provider computing device sends one or more files to the merchants' banks containing information and/or instructions to directly debit the amounts owed by the merchants from their bank accounts. At step 270, the direct debit service provider computing device credits or transfers the amounts owed by the merchants to the bank account of the rewards program 102.

EXAMPLES

The following examples are provided to further illustrate the disclosed subject matter. They should not be used to constrict or limit the scope of the claims in any way. The examples describe a conventional card-linked rewards programs having certain technical defects. The examples also describe novel card-linked rewards programs, both offer-based programs and loyalty-based programs that solve one or more of the technical defects of conventional programs and/or provide additional benefits and features.

Example 1—Conventional Card-Linked Cash-Back Offer Program

This is an example of a conventional card-linked cash-back offer program. A participating merchant (e.g., restaurant) agrees with an offer aggregator (e.g., Groupon, Living Social, etc.) to give certain payment card users a 20% cash-back reward on a qualifying purchase in the form of a credit card statement credit. The number of offers is limited to a total of 500, and the offers must be redeemed within a 30-day window. The offers are limited to card users that link the specific offer to a qualifying payment card and then pay with payment cards that are part of a specified payment card association (e.g., Visa, Mastercard, Discover, American Express, etc.). The merchant agrees to pay the offer aggregator 30% of the total of the qualifying purchase.

The offer aggregator markets the offer by publishing it on the offer aggregator's website. A card user claims the offer on the website and provides the number of a payment card that is then linked to the offer. The payment card information is transferred from the offer aggregator to the payment card association so the payment card association can track usage of the payment card and determine whether it is used to make a qualified purchase at the merchant during the 30-day window of the offer.

The card user visits the merchant during the 30-day window and uses the linked payment card to make a qualified purchase of $100. The merchant uses a payment card input device to obtain the payment card information from the card user. The payment card input device transfers one or more files containing the payment card information and payment transaction details to a payment card processor.

The payment card processor transfers one or more files to the card issuing bank through the network of the payment card association. The card issuing bank receives the payment card transaction information and confirms: (i) the payment card is valid, (ii) the card user has sufficient funds or credit to make the purchase, and/or (iii) the card user's account is in good standing.

The card issuing bank transfers one or more files containing a response code approving or declining the transaction to the payment card processor through the payment card association's network. The payment card processor transfers one or more files containing the response code to the merchant's payment card input device where it is stored in a batch file awaiting settlement.

At the close of the day, the merchant's payment card input device transfers the approved authorization for the $100 purchase as part of a batch of approved authorizations to the payment card processor. The payment card processor transfers one or more files containing the approved authorization for the $100 purchase to the payment card association with a request to transfer the amount owed from the card issuing bank to the merchant's bank account.

The payment card association analyzes the payment card transaction information in the file(s) and determines that the $100 purchase qualifies for the cash-back offer. The payment card association transfers one or more files to the offer aggregator containing the amount of the transaction, the amount of the cash-back award, and the date/time of the transaction.

The payment card association debits the $100 purchase from the card issuing bank and transfers it, minus any processing fees, to the merchant's bank account at the merchant's bank (acquiring bank). The payment card association, subject to the offer aggregator's funding the reward, and as instructed by the offer aggregator, also transfers $20 (20% of the qualifying purchase) to the card issuing bank to be applied to the card user's account as a cash-back reward.

The payment card association sends an invoice to the offer aggregator at the end of a monthly billing period for the $20 reward given to the card user and then withdraws funds from an agreed-upon account funded by the offer aggregator to finance the $20 reward. The offer aggregator likewise sends an invoice to the merchant at the end of a monthly billing period for $30 (30% of the qualifying purchase).

The offer program provides some advantages such as quickly giving the card user the cash-back reward. Unfortunately, the offer program also suffers from a number of problems. One problem is that the card user has no lasting connection with the merchant and/or the offer aggregator after receiving the cash-back. The card user has received the full reward and has little or no reason to continue the relationship with either entity.

Another problem is that the offer program is limited to a single payment card association because it tracks and reports usage of the payment card, which gives it the ability to limit or foreclose the possibility of expanding the offer program to payment cards handled by other payment card associations.

Another problem is that the offer aggregator must pay the payment card network while simultaneously trying to invoice and collect from large numbers of merchants who often take 60 to 90 days to pay and may dispute fees otherwise due to the offer aggregator or, worse, go out of business and leave the offer aggregator with no recourse. This can create serious cash flow problems for the offer aggregator.

Example 2—Automated Card-Linked Cash-Back Offer Program

Before describing this example, it should be appreciated that any exchange of information, requests for payment, and the like, by any of the described entities in this example or any of the following examples can be accomplished by transferring one or more files (encrypted or not encrypted) between computing devices owned or controlled by each respective entity using a secure file transfer protocol (SFPT or SSH File Transfer Protocol). For example, all transfers between the rewards program operator and the participating merchant, payment card processor, automated clearing house (ACH) provider, and payment card user can be done in this manner. Also, all internal transfers between different aspects of the rewards program can be done in this manner.

This is an example of a novel card-linked cash-back offer program. A participating merchant agrees with a rewards program operator to offer payment card users who are part of the rewards program a 20% cash-back reward on a qualifying purchase. The number of offers is limited to a total of 500, and the offers must be redeemed within a 30-day window. The merchant agrees to pay the rewards program operator 30% of the total of the qualifying purchase.

The merchant also agrees to allow the rewards program operator to debit any amounts owed under the offer program from the merchant's bank account immediately or shortly after the card user makes a qualified transaction. When required by the bank or ACH provider, the merchant informs and authorizes its bank to allow the rewards program operator to make direct debits (the authorization is a one-time authorization after which the debits continue automatically without further need for authorization).

The rewards program operator markets the offer on its website. A card user claims the offer on the website and provides the number of a payment card that is then linked to the offer. The rewards program operator associates the card user with the linked payment card and stores this data in a member database. The rewards program operator transfers one or more files containing the payment card information to the payment card processor used by the merchant. The payment card processor monitors the merchant's payment card transactions to determine whether the linked card is used to make a qualified purchase within the 30-day window of the offer program.

The card user visits the merchant during the 30-day window and uses the linked payment card to make a qualified purchase of $100. The merchant uses a payment card input device to obtain the payment card information from the card user. The payment card input device transfers one or more files containing the payment card transaction information (i.e., the payment card information and payment transaction details) to the payment card processor.

The payment card processor transfers one or more files to the card issuing bank through, for example, the network of the payment card association. The card issuing bank receives the payment card transaction information and confirms: (i) the payment card is valid, (ii) the card user has sufficient funds or credit to make the purchase, (iii) the card user's account is in good standing, etc.

The card issuing bank transfers one or more files containing a response code approving or declining the transaction to the payment card processor through, for example, the network of the payment card association. The payment card processor transfers one or more files containing the response code to the merchant's payment card input device where it is stored in a batch file awaiting settlement.

At the close of the day, the merchant's payment card input device transfers the approved authorization for the $100 purchase as part of a batch of approved authorizations to the payment card processor. The payment card processor transfers one or more files containing the approved authorization for the $100 purchase to the payment card association with a request to transfer the amount owed from the card issuing bank to the merchant's bank account. The payment card association debits the $100 purchase from the card issuing bank and transfers it, minus processing fees, to the merchant's bank account at the merchant's bank (acquiring bank).

The payment card processor also analyzes the file(s) containing the authorized payment card transactions and determines that the $100 purchase qualifies for the cash-back offer. The payment card processor reports the $100 payment card transaction to the rewards program operator as qualifying for the offer. The payment card processor does this by transferring one or more files to the rewards program operator containing payment card transaction information (e.g., linked card number, payment amount, date, time, and the like) for the $100 purchase and, optionally, any other qualifying payment card transactions for the day or other period of time.

After receiving the payment card transaction information from the payment card processor, the rewards program operator sends one or more files with instructions to debit $30 (30% of the total purchase) from the merchant's bank account. For example, the rewards program operator sends a request to direct debit the amount owed from the merchant's bank account using an automated clearing house (ACH) provider.

The rewards program operator credits the payment card of the card user $20. This can be done by using the same or different payment card processor. The rewards program operator transfers one or more files to the payment card processor containing instructions to transfer $20 from a bank account of the rewards program to the card user's account at the card issuing bank. The rewards program operator keeps $10.

This example provides some technical advantages compared to Example 1. One advantage is that the rewards program operator immediately receives payment for all amounts owed by participating merchants thereby reducing or eliminating cash flow problems. Another advantage is that the merchant is charged a small daily amount, which is easier for the merchant to pay than a large amount that accumulates over a longer period of time (e.g., month or more).

Example 3—One-Time Card-Linked Reward Credits Offer Program

This is an example of a novel one-time card-linked reward credits offer program. A participating merchant agrees with a rewards program operator to pay the rewards program operator 20% of the total of a qualifying purchase made by a payment card user using a linked payment card. The rewards program operator agrees with the card user to give a 20% reward credit for the qualifying purchase—a reward credit that is valid to make purchases within a specific redemption platform or set of redemption platforms. The number of offers is limited to a total of 500, and the offers must be redeemed within a 30-day window.

The merchant also agrees to allow the rewards program operator to debit any amounts owed under the offer program from the merchant's bank account immediately or shortly after the amounts become due. The merchant informs and authorizes its bank to allow the rewards program operator to make direct debits.

The rewards program operator markets the offer on its website. A card user claims the offer on the website and provides the number of a payment card that is then linked to the offer. The rewards program operator associates the card user with the linked payment card and stores this data in a member database. The rewards program operator transfers one or more files containing the payment card information to the payment card processor used by the merchant. The payment card processor monitors the merchant's payment card transactions to determine whether the linked card is used to make a qualified purchase within the 30-day window of the offer program.

The card user visits the merchant during the 30-day window and uses the linked payment card to make a qualified purchase of $100. The merchant uses a payment card input device to obtain the payment card information from the card user. The payment card input device transfers one or more files containing the payment card transaction information (i.e., the payment card information and payment transaction details) to the payment card processor. The payment card transaction is authorized, and the amount is paid to the merchant in the same manner described in Example 2.

The payment card processor also analyzes the file(s) containing the authorized payment card transactions and determines that the $100 purchase qualifies for the offer. The payment card processor reports the $100 payment card transaction to the rewards program operator as qualifying for the offer. The payment card processor does this by transferring one or more files to the rewards program operator containing payment card transaction information (e.g., linked card number, payment amount, date, time, and the like) for the $100 purchase and, optionally, any other qualifying payment card transactions for the day or other period of time.

After receiving the payment card transaction information from the payment card processor, the rewards program operator sends one or more files with instructions to debit $20 (20% of the total purchase) from the merchant's bank account. For example, the rewards program operator sends a request to direct debit the amount owed from the merchant's bank account using an automated clearing house (ACH) provider.

The rewards program operator gives the card user 20 reward credits. This is done by updating a database that stores the card user's rewards account. The database contains information such as the card user's name, linked payment card number, reward credits information (e.g., amount received, amount spent, total amount in card user's account, and the like), and the like. The card user can redeem the reward credits for the outright purchase of or discounts on other goods and services offered as part of a rewards redemption platform.

This example provides a number of technical advantages compared to Example 1. First, the merchant pays less to get the card user to make a purchase—i.e., the merchant pays $20 instead of $30 in Example 1. Second, the rewards program operator increases cash flow—i.e., the rewards program operator receives $20 instead of $10 in Example 1. Third, the rewards program operator can control profit margins by adjusting the value of the reward credits when redeemed for other goods and services. Fourth, the rewards program operator can control profit margins by securing greater margins on the eligible goods and services or limiting redemption to those goods or services with higher margins. Fifth, the card user stays engaged with the loyalty program by collecting and redeeming the reward credits.

Example 4—Card-Linked Reward Credits Loyalty Program

This is an example of a novel continuous card-linked reward credits loyalty program. A merchant agrees with a rewards program operator to pay the rewards program operator 10% of the total of a qualified purchase made by a payment card user using a linked payment card. The rewards program operator agrees to give the card user a 5% reward credit for the qualifying purchase. There is no limit on the number of times or dates when the card user can make purchases and earn reward credits.

The merchant also agrees to allow the rewards program operator to debit any amounts owed under the offer program from the merchant's bank account immediately or shortly after the amounts become due. The merchant informs and authorizes its bank to allow the rewards program operator to make direct debits.

The rewards program operator markets the loyalty program and signs up card users on its website. Each card user provides the card number of one or more payment cards that are then linked to the loyalty program. The rewards program operator associates the card user with the linked payment card(s) and stores this data in a member database. The rewards program operator transfers one or more files containing the payment card information for the linked payment cards to the payment card processor used by the merchant. The payment card processor monitors the merchant's payment card transactions to identify any transactions made with a linked payment card.

The card user visits the merchant and uses a linked payment card to make a qualified purchase of $100. The merchant uses a payment card input device to obtain the payment card information of the payment card. The payment card input devices transfer one or more files containing the payment card transaction information (i.e., the payment card information and payment transaction details) to the payment card processor. The payment card transaction is authorized, and the amount is paid to the merchant in the same manner described in Example 2.

The payment card processor also analyzes the file(s) containing the authorized payment card transactions and determines that the $100 purchase qualifies under the loyalty program. The payment card processor reports the $100 payment card transaction to the rewards program operator as qualifying under the loyalty program. The payment card processor does this by transferring one or more files to the rewards program operator containing payment card transaction information (e.g., linked card number, payment amount, date, time, and the like) for the $100 purchase and, optionally, any other qualifying payment card transactions for the day or other period of time After receiving the payment card transaction information from the payment card processor, the rewards program operator sends one or more files with instructions to debit $10 (10% of the total purchase) from the merchant's bank account. For example, the rewards program operator sends a request to direct debit the amount owed from the merchant's bank account using an automated clearing house (ACH) provider.

The rewards program operator gives the card user 5 reward credits. This is done by updating a database that stores the card user's rewards account. The database contains information such as the card user's name, linked payment card number, reward credits information (e.g., amount received, amount spent, total amount in card user's account, and the like), and the like. The card user can redeem the reward credits for the outright purchase of or discounts on other goods and services offered as part of a rewards redemption platform.

This example provides a number of technical advantages compared to Example 3. First, the program is always available and can be used for unlimited purchases. Second, the merchant pays less per purchase—i.e., the merchant pays 10% instead of 20% in Example 3—but greatly expands the availability of the rewards to appeal to more card users. Third, the rewards program operator receives 10% of a greater volume of transactions, which increases cash flow. Fourth, the rewards program operator can control profit margins by securing greater margins on the eligible goods and services or limiting redemption to those goods or services with higher margins. Fifth, the rewards program operator can control profit margins by adjusting the amount and/or value of the reward credits given to the card user. Sixth, the card user stays engaged with the loyalty program by collecting and redeeming the reward credits within the loyalty program platform.

Example 5—Payment Card Transaction Reporter Variations

This is a variation of the rewards programs described in Examples 2-4 where any entity can report payment card transactions. In this example, the rewards program operator has a standardized input/output interface through which any reporting entity can report payment card transactions made with a linked payment card. Examples of entities that can report payment card transactions include the merchant's payment card processor, the payment card association associated with the payment card, the manufacturer of the hardware or software used by the merchant to acquire the payment card information from the card user, and the like.

Examples 2-4 can be modified to allow any of these entities to report qualifying payment card transactions to the rewards program operator. The other details of the examples remain the same except the entity that reports the qualifying payment card transactions. The payment card transactions are typically reported daily (e.g., batch file sent at beginning or end of day) but can be reported individually or at other intervals such as 2-5 times a week or month. The rewards program operator can enter into a separate agreement with each reporting entity to allow reporting of qualifying transactions made at any merchant with a linked payment card.

This example provides a number of technical advantages. One advantage is that the rewards program operator can provide cash-back or reward credits for transactions involving any payment card linked by the card user instead of only those payment cards that are part of a payment card association. Another advantage is that it also allows payment card associations to participate in the rewards program while keeping it open to payment cards that are not part of the association. Another advantage is that it encourages the various entities involved in the rewards program to work with each other to realize greater economies of scale.

Example 6—Rewards Redemption on Any Platform

This is a variation of the rewards programs described in Examples 3-5 where the reward credits can be used with other platforms not owned or controlled by the rewards program operator. The rewards program operator has a standardized input/output interface—e.g., application programming interface—that can be used by other platforms to allow the card user to redeem reward credits for goods and services. Other platforms include other deal or offer aggregators, merchants, and the like.

The following is one example of a way the card user can redeem or spend the reward credits. A merchant that sells a product or service agrees with the rewards program operator to accept reward credits from the rewards program as a form of payment for goods and services offered by the merchant. The rewards program operator agrees to pay the merchant in currency for anything purchased with reward credits. The amount paid by the rewards program operator can be discounted compared to the price advertised to the card user. The merchant modifies its systems to include prices of items in reward credits.

The card user visits the merchant's website or physical location and is given the option to use the reward credits to make a purchase. The card user chooses to pay with reward credits. The card user logs in or otherwise authenticates with the rewards program using the standardized input/output interface or another method. The card user approves the purchase with the rewards program.

The rewards program transfers one or more files to the merchant authorizing the purchase. The card user completes the purchase with the merchant. The rewards program operator transfers the amount owed to the merchant as a credit transfer using the automated clearing house network. This can occur at the end of each day or at another time period (multiple times per week, bi-weekly, multiple times per month, bi-monthly, and the like).

This example provides a number of technical advantages. One advantage is that it allows the reward credits to be redeemed for a wide variety of goods and services thereby avoiding situations where the reward credits can only be redeemed for a single or limited number of goods or services (e.g., airline miles) or for cash-back, which has the disadvantages noted above. Another advantage is that users are more likely to perceive greater value in and remain engaged with the rewards program when reward credits can be redeemed for a wide variety of goods and services.

Example 7—Linking Rewards Program Operator and Rewards Redemption Platforms

This is a variation of the rewards programs described in Examples 3-6 where the rewards program operator has a single sign on (SSO) service that allows the card user to securely log into any third-party e-commerce platform. The card user can use the third-party's website to access, redeem, and even reward-back reward credits for purchases made on these external platforms.

The rewards program operator and the third-party platform agree to allow the card user to log into the third-party platform using the stored credentials for the rewards program platform. When the card user visits the third-party platform, the card user is automatically logged into the third-party platform and given the ability to access, redeem, and be rewarded credits for purchases made on the third-party platform.

This example provides a number of technical advantages. The main advantage is that it allows the card user to easily access and redeem reward credits on the websites of participating merchants. This gives the card user an incentive to continue engaging with the rewards program and, thus, increases the number of transactions made by the card user at participating merchants.

Example 8—Variable Reward Credits

This is a variation of the rewards programs described in Examples 3-7 where the amount of reward credits given to the card user varies based on certain factors. For example, the amount of reward credits is increased depending on the type of payment card used (e.g., debit card, gift card, credit card, etc.), number of times the card user visits a specific merchant in a defined period (e.g., a month), whether the card user refers friends to join the rewards program, and the like.

In this example, the amount of reward credits given to the card user is increased depending on the type of payment card used. For example, the use of a payment card associated with a payment card association that charges the merchant high fees can result in reward credits of 5% of the total purchase while the use of a debit card or gift card that charges the merchant lower fees can result in boosted reward credits of 7% of the total purchase.

In this example, the amount of reward credits given to the card user for visiting the same merchant in a defined period (e.g., a month) is boosted for second and subsequent visits. For example, the card user can be given reward credits of 5% of the total purchase for the first visit and 10% of the total purchase for each subsequent visit during the specified time period.

In this example, the amount of reward credits given to the card user is increased based on the number of friends the card user refers to the rewards program. For example, the amount of reward credits can be increased by 1% for 3 months for each friend that signs up for the rewards program. The amount of reward credits is permanently increased (e.g., doubled) for a longer period of time (e.g., six months, a year, two years, forever) if the card user signs up a specified number of friends (e.g., 50, 75, 100) to the rewards program.

This example provides a number of technical advantages. One advantage is that it rewards card users who use lower cost payment cards such as debit and gift cards, which results in increased revenue and profit for the merchant and incentivizes merchants to join, increase participation in the rewards program, and/or sign-up new card users to the rewards program. Another advantage is that it encourages the card user to visit the same merchant multiple times, which provides the same benefits. Another advantage is that it encourages the card user to recruit new card users to the rewards program, which increases the size and reach of the rewards program.

Example 9—Reward Credits Handling

This is a variation of the rewards programs described in Examples 3-8 where the reward credits are securely stored and transferred. The reward program operator has a secure database or "credit vault" in which is stored both a secure user account and credit balance storage facility that houses the ledgers of reward credits. The card user can access the credits by logging into the reward program operator's web site using a username and password and, optionally, additional authentication protocols such as two factor authentication.

Accounting of the reward credits can be performed using secure file transfer and data storage protocols. For example, the transfer or communication of reward credits between the rewards program operator and other parties affiliated with the rewards program can be performed using these protocols.

Example 10—Rewards Program User Acquisition

This is a variation of the rewards programs described in Examples 3-9 where the merchant assists the rewards program operator with acquiring new users or members of the rewards program. In this example, the reward program operator associates new card users with a specific merchant. Every time the new card user makes a purchase from the merchant with a payment card linked to that user, the merchant receives a discount on the fee owed to the rewards program operator. Purchases made by the new card user at other merchants are unaffected.

For example, a new card user that is introduced to the rewards program by Merchant 1 is associated with Merchant 1 in the member database maintained by the rewards program operator. The new card user will receive the same amount of reward credits for any purchases made at any merchant in the rewards program. Also, merchants other than Merchant 1 pay the standard fee to the rewards program operator for purchases made by the new card user. However, the rewards program operator reduces the fee charged to Merchant 1 for purchases made by the new card user (e.g., 9% instead of 10%). The discount can apply for all future purchases by the new card user or may expire after a specified time period (e.g., one or more months, one or more years, and the like).

The benefits of acquiring new users or members can also extend to other entities besides the merchant. For example, the rewards program operator can provide the same or similar benefits to banks, card issuers, social media influencers, media channels, or the like for assisting with signing up users to the rewards program. Any new card user introduced to the rewards program by any qualified third party can be associated with the third party in the member database maintained by the rewards program operator. The third party can earn one or more fees for the initial acquisition of the user and/or ongoing fees for transactions made by the user. In this way, the rewards program is a source of fee revenue for the third parties instead of an expense like many other rewards programs.

This example provides a number of technical advantages. One of the main advantages is that it incentivizes the merchant to sign new card users up for the rewards program. The new card users have an incentive to visit the merchant more often to receive the reward credits from the rewards program. The merchant has the incentive of increasing the number of purchases made by the new card user due to being part of the rewards program and paying the rewards program operator a discounted fee for purchases made by the new card user.

Example 11—Rewards Program Automation

This is a variation of the rewards programs described in Examples 3-10 where some or all the actions involved are performed simultaneously and/or in real-time. For example, when the card user makes a purchase with a linked payment card the following actions are performed simultaneously and/or in real time: (i) the card user is notified by the rewards program operator that he/she has made a purchase and will receive a reward (pop-up notification on phone, email, text message, and the like), (ii) the user dashboard for the card user maintained by the rewards program operator is updated to reflect the new balance of reward credits and rewards history, and/or (iii) the merchant dashboard for the merchant maintained by the rewards program operator is updated to show the volume and amount of transactions and their automatically generated fee debit detail. Every 24 hours, the rewards program operator processes the daily fee debit batches through the automated ACH SFTP connection.

Electronic Computing Device

FIG. 3 shows one embodiment of an electronic computing device 101 (alternatively referred to as an electronic controller, programmable logic controller, electronic control system, electronic computing system, or computer) that can used as part of the rewards program. One or more electronic computing devices 101 can be used by each of the rewards program operator, the payment card processor, the merchant, the card user, and/or any other entities involved with the rewards program. For example, the electronic computing device 101 can be used to receive transferred files, store data, and the like.

The electronic computing device 101 includes a processor 103 (alternatively referred to as a digital processing unit or microprocessor) and memory 105 communicatively linked together by way of a system bus 107. In some embodiments, the electronic computing device 101 can also include other devices communicatively linked to the system bus 107 such as a storage device 109, display device 111, input devices 113, output devices 115, communication interfaces 117, power source 119, or the like.

It should be appreciated that the electronic computing device 101 can have a variety of configurations. For example, in some embodiments, all or most of the various components of the electronic computing device 101 can be coupled together near each other and the system bus 107. In other embodiments, various components of the electronic computing device 101 can be located remotely. For example, the input devices 113 and/or output devices 115 can be located remotely or at a distance from the processor 103 and/or the memory 105.

Processor

The processor 103 is an electric circuit such as an integrated circuit that executes program instructions. The processor 103 can perform things such as arithmetic operations, logic operations, controlling operations, and input/output (I/O) operations specified by the program instructions. In some embodiments, the processor 103 includes a control unit (CU), an arithmetic logic unit (ALU), and/or a memory unit (alternatively referred to as cache memory).

The control unit can direct the operation of the processor 103 and/or instruct the memory 105, arithmetic logic unit, and output devices 115 how to respond to instructions in the program. It can also direct the flow of data or information between the processor 103 and other components of the electronic computing device 101. It can also control the operation of other units by providing timing and control signals.

The arithmetic logic unit is an electric circuit in the processor 103 that performs integer arithmetic and bitwise logic operations. The arithmetic logic unit receives input in the form of data or information to be operated on and code indicating the operation to be performed. The arithmetic logic unit provides the result of the performed operation as output. In some configurations, the arithmetic logic unit can also include status inputs and/or outputs that convey information about a previous operation or the current operation between the arithmetic logic unit and external status registers.

It should be appreciated that the processor 103 can have any of a number of suitable configurations. For example, the processor 103 can range from a simple processor specially built or configured to execute one or more programs for a specific application or device to a complex central processing unit configured to be used in a wide variety of ways and an equally wide variety of applications. Examples of processors 103 include a general-purpose processor, a digital signal processor (DSP), an application specific integrated circuit (ASIC), a central processing unit (CPU), a field programmable gate array (FPGA) or other programmable logic device, and/or discrete gate or transistor logic. The processor 103 can also be implemented as any individual or combination of these devices.

Memory

The memory 105 (alternatively referred to as primary memory, main memory, or a computer-readable medium) is a semiconductor device or system used to store information for immediate use by the processor 103. The memory 105 is generally directly accessible to the processor 103. The processor 103 can read and execute program instructions stored in the memory 105 as well as store data and/or other information in the memory 105 that is actively being operated on. The memory 105 is generally more expensive and operates at higher speeds compared to the storage device 109. The memory 105 can be volatile such as random-access memory (RAM) or non-volatile such as read-only memory (ROM).

System Bus

The system bus 107 broadly refers to the communication system through which information is transferred between the processor 103, memory 105, and/or other components in the electronic computing device 101. The system bus 107 can include a physical system of connectors, conductive pathways, optical pathways, wires, or the like through which the information travels.

It should be appreciated that information shared between the components of the electronic computing device 101 can include program instructions, data, signals such as control signals, commands, bits, symbols, or the like. The information can be represented using a variety of different technologies and techniques. For example, in some embodiments, the information can be represented by voltages, currents, electromagnetic waves, magnetic fields or particles, optical fields, or the like.

The system bus 107 can use a variety of communication protocols or protocol suites to communicatively link the processor 103 and/or memory 105 with the input devices 113 and/or the output devices 115. For example, suitable communication protocols include TCP/IP, IPX/SPX, Modbus, DNP, BACnet, ControlNet, Ethernet/IP, or the like.

Storage Device

The storage device 109 (alternatively referred to as secondary memory, or a computer-readable medium) is a device or system used to store information that is not needed for immediate use by the processor 103. The storage device 109 is generally not directly accessible to the processor 103. The storage device 109 is generally less expensive and operates at lower speeds compared to the memory 105. The storage device 109 is also generally non-volatile and used to permanently store the information.

The storage device 109 can take a variety of physical forms and use a variety of storage technologies. For example, in some embodiments, the storage device 109 can be in the form of a hard disk storage device, solid-state storage device, optical storage device, or the like. Also, in some embodiments, the storage device 109 can use technologies such as a magnetic disk (e.g., disk drives), laser beam (e.g., optical drives), semiconductor (e.g., solid-state drives), and/or magnetic tape.

In some embodiments, the storage device 109 is configured to store one or more databases or data stores 125. The database is 125 can be used to store a variety of information or data such as information about the card user, the rewards program, payment card transactions, participating merchants, and the like.

Display Device

The display device 111 (alternatively referred to as a human-machine interface (HMI) or screen) is a device that visually conveys text, graphics, video, and/or other information. In some embodiments, the information shown on the display device 111 exists electronically and is displayed for a temporary period of time. It should be appreciated that the display device 111 can operate as an output device and/or input device (e.g., touchscreen display or the like).

It should be appreciated that the display device 111 can include a variety of physical structures and/or display technologies. For example, in some embodiments, the display device 111 can be a screen integrated into a specific application or technology, a separate screen such as a monitor, or the like. The display device 111 can also be a liquid crystal display, a light emitting diode display, a plasma display, a quantum dot display, or the like.

Input Devices

The input devices 113 are physical components that provide information to the processor 103 and/or the memory 105. The input devices 113 can be any suitable type and can provide any of a variety of information. For example, the input devices 113 can be digital and/or analog devices and can provide information in a digital or analog format. Also, the input devices 113 can be used to provide user input for controlling the electronic computing device 101 or operational input for controlling aspects of the specific application.

The input devices 113 can include sensors 121 and other miscellaneous input devices 123. It should be appreciated that the input devices 113 are not limited to only providing information. In some embodiments, the input devices 113 can also receive information. Such devices can be considered both input devices 113 and output devices 115.

The miscellaneous input devices 123 can include a variety of devices or components. In some embodiments, the miscellaneous input devices 123 can include magnetic card readers, near field communication card readers, and the like. In some embodiments, the miscellaneous input devices 123 include user interface components such as a pointing device, for example a mouse, text input devices, for example a keyboard, a touch screen, or the like.

Output Devices

The output devices 115 are physical components that receive information from the processor 103 and/or the memory 105. The output devices 115 can be any suitable type and can receive any of a variety of information. For example, the output devices 115 can be digital and/or analog devices and can receive information in a digital and/or analog format. Also, the output devices 115 can be used to provide information to the user or perform various operations related to the specific application.

The output devices 115 can include a variety of other miscellaneous output devices 127. It should be appreciated that the output devices 115 are not limited to only receiving information. In some embodiments, the output devices 115 can also send information. Such devices can be considered both output devices 115 and input devices 113.

The miscellaneous output devices 127 can include a variety of devices or components. In some embodiments, the miscellaneous output devices 127 can include display devices, speakers, and the like.

Communication Interfaces

The communication interfaces 117 are physical components that allow the electronic computing device 101 to communicate with other devices, components, and/or networks. The communications interfaces 117 can include wired communication interfaces 129 and/or wireless communication interfaces 131.

It should be appreciated that the communication interfaces 117 can include any suitable physical device. For example, in some embodiments, the communication interfaces 117 can include a network interface controller used to connect the electronic computing device 101 to a larger network such as a local area network (LAN), wide area network (WAN), or the Internet.

It should also be appreciated that the communication interfaces 117 can use a variety of communication protocols. For example, in some embodiments, the wired communication interfaces 129 can use communication protocols such as Ethernet, RS-232, RS-485, USB, or the like. Also, in some embodiments, the wireless communication interfaces 131 can use communication protocols such as Wi-Fi, Bluetooth, Zigbee, LTE, 5G, or the like.

Power Source

The power source 119 can be used to supply electric power to the electronic computing device 101. The power source 119 can provide any suitable type of power including AC power, DC power, or the like. The power source 119 can be any suitable power source including an AC power source (standard wall outlet), DC power source (a transformer plugged into a wall outlet), battery, generator, or the like.

In some embodiments, the power source 119 includes a power supply that converts electric current from a source to a desired voltage, current, and frequency to power the electronic computing device 101. In some embodiments, the power supply can convert AC power ranging from 110-240 VAC to DC power ranging from 6-60 VDC.

Circuit Board

The electronic computing device 101 can include one or more circuit boards to which one or more of the components can be coupled. For example, the processor 103, the memory 105, the storage device 109, the display device 111, the input devices 113, the output devices 115, the communication interfaces 117, and/or the power source 119 can be coupled to one or more circuit boards. In some embodiments, the processor 103, the memory 105, and/or the storage device 109 can be coupled to one circuit board.

In some embodiments, the circuit board can contain a series of conductive tracks, pads, and/or other features etched from one or more sheet layers of copper laminate laminated onto and/or between sheet layers of nonconductive substrate. The conductive features can be part of the system bus 107 communicatively linking the various components of the electronic computing device 101. In some embodiments, the circuit board can be a printed circuit board.

Program Instructions

The instructions stored in the electronic computing device 101 can include software algorithms or programs for controlling transferring files between the various entities in the rewards system and/or involved in processing financial transactions involving at least one of the entities in the rewards program. It should be appreciated that the software algorithms can be expressed in the form of methods or processes performed in part or entirely by the electronic computing device 101 or as instructions stored in a computer-readable medium such as the memory 105 and/or the storage device 109. Likewise, the software algorithms are shown in the flowcharts and described in the methods and/or processes.

It should be appreciated that instructions can take the form of entirely software (including firmware, resident software, micro-code, or the like), entirely hardware, or a combination of software and hardware. If implemented in software executed by the processor 103, the information may be stored on or transferred over a computer-readable medium such as the memory 105 and/or the storage device 109. In some embodiments, the instructions can be contained in any tangible medium of expression having program code embodied in the medium. In some embodiments, the instructions can be written in any combination of one or more programming languages.

It should also be appreciated that the flowcharts, block diagrams, method, processes describe algorithms and/or symbolic representations of information operations. The algorithmic descriptions and representations are the means used by those skilled in the data processing arts to convey the substance of their work most effectively to others skilled in the art. These operations, while described functionally or logically, are understood to be implemented by software that can readily and easily be created by the functional or logical descriptions of the algorithms.

Cloud Computing

The present embodiments can also be provided in cloud computing environments. Cloud computing refers to a model for enabling ubiquitous, convenient, on-demand network access to a shared pool of configurable computing resources (e.g., networks, servers, storage, applications, and/or services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., software as a service ("SaaS"), platform as a service ("PaaS"), infrastructure as a service ("IaaS")), and deployment models (e.g., private cloud, community cloud, public cloud, hybrid cloud, etc.).

Computer Network

The embodiments can be implemented in a wide variety of computer network systems over numerous topologies. This can include the configuration and management of large networks comprising storage devices and computers that are communicatively linked to dissimilar computers and storage devices over a network, such as the Internet.

General Terminology and Interpretative Conventions

Any methods described in the claims or specification should not be interpreted to require the steps to be performed in a specific order unless expressly stated otherwise. Also, the methods should be interpreted to provide support to perform the recited steps in any order unless expressly stated otherwise.

Certain features described in the context of separate embodiments can also be implemented in combination in a single embodiment. Conversely, various features that are described in the context of a single embodiment can also be implemented in multiple embodiments separately or in any suitable subcombination. Moreover, although features may be described above in certain combinations and even initially claimed as such, one or more features from a claimed combination can be excised from the combination, and the claimed combination may be directed to a subcombination or variation of a subcombination.

The example configurations described in this document do not represent all the examples that may be implemented or that are within the scope of the claims. The term "example" shall be interpreted to mean "serving as an example, instance, or illustration," and not "preferred" or "advantageous over other examples."

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items.

The phrase "based on" shall be interpreted to refer to an open set of conditions unless unequivocally stated otherwise (e.g., based on only a given condition). For example, a step described as being based on a given condition may be based on the recited condition and one or more unrecited conditions.

The terms have, having, contain, containing, include, including, and characterized by should be interpreted to be synonymous with the terms comprise and comprising—i.e., the terms are inclusive or open-ended and do not exclude additional unrecited subject matter. The use of these terms should also be understood as disclosing and providing support for narrower alternative embodiments where these terms are replaced by "consisting of" or "consisting essentially of."

Unless otherwise indicated, all numbers or expressions, such as those expressing dimensions, physical characteristics, or the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and by applying ordinary rounding techniques.

All disclosed ranges are to be understood to encompass and provide support for claims that recite any subranges or any individual values subsumed by each range. For example, a stated range of 1 to 10 should be considered to include and provide support for claims that recite any subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth), which values can be expressed alone or as a minimum value (e.g., at least 5.8) or a maximum value (e.g., no more than 9.9994).

All disclosed numerical values are to be understood as being variable from 0-100% in either direction and thus provide support for claims that recite such values (either alone or as a minimum or a maximum—e.g., at least <value> or no more than <value>) or any ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range expressed individually (e.g., 15.2), as a minimum value (e.g., at least 4.3), or as a maximum value (e.g., no more than 12.4).

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

None of the limitations in the claims should be interpreted as invoking 35 U.S.C. 112(f) unless the words "means for" or "step for" are explicitly recited in the claim.

Unless explicitly stated otherwise or otherwise apparent from context, it is terms such as "processing," "computing," "calculating," "determining," "displaying," or the like, refer to the action and processes of an electronic computing device including a processor and memory.

The subject matter recited in the claims is not coextensive with and should not be interpreted to be coextensive with any embodiment, feature, or combination of features described or illustrated in this document. This is true even if only a single embodiment of the feature or combination of features is illustrated and described.

Incorporation by Reference

The entire content of each document listed below is incorporated by reference into this document (the documents below are collectively referred to as the "incorporated documents"). If the same term is used in both this document and one or more of the incorporated documents, then it should be interpreted to have the broadest meaning imparted by any one or combination of these sources unless the term has been explicitly defined to have a different meaning in this document. If there is an inconsistency between any incorporated document and this document, then this document shall govern. The incorporated subject matter should not be used to limit or narrow the scope of the explicitly recited or depicted subject matter.

Priority patent documents incorporated by reference:
- Int'l Pat. Pub. No. WO 2022/120389 (App. No. PCT/US2021/072746), titled "Technical Improvements to Payment Card Linked Rewards Programs," filed on 4 Dec. 2021, published on 9 Jun. 2022.
- U.S. Prov. App. No. 63/121,909, titled "Full Circle Rewards Ecosystem," filed on 5 Dec. 2020.

What is claimed is:

1. A non-transitory machine readable medium storing instructions, which, when executed, cause a rewards platform computing system to:
   receive a payment card setup file from a card user computing device, the payment card setup file including a card number of a payment card, the payment card setup file being received by one or more rewards platform computing devices that are part of the rewards platform computing system;
   associate the card number in the payment card setup file with a card user who is a member of a rewards program and store the card number and card user information in one or more rewards platform databases;
   receive a merchant setup file from a merchant computing device, the merchant setup file including an authorization to direct debit an amount owed by a merchant participating in the rewards program from a merchant bank account, the merchant setup file being received by the one or more rewards platform computing devices that are part of the rewards platform computing system;
   associate the merchant with the authorization to direct debit the amount owed by the merchant and store the merchant and the authorization in the one or more rewards platform databases;
   instruct one or more rewards platform communication interfaces to send a card number file including the card number of the payment card to one or more payment card transaction reporter computing devices of a payment card transaction reporter, the payment card transaction reporter being configured to receive files including payment card transactions from a payment input device at the merchant and process the payment card transactions for the merchant over an electronic payment processing network;
   instruct the one or more rewards platform communication interfaces to send a merchant file including a merchant identifier for the merchant to the one or more payment card transaction reporter computing devices;
   receive a qualifying transaction file from the one or more payment card transaction reporter computing devices, the qualifying transaction file including payment card transaction information for at least one payment card transaction made with the payment card at the merchant; the qualifying transaction file being received by the one or more rewards platform computing devices;

instruct the one or more rewards platform communication interfaces to send a debit file to a direct debit service provider computing device of a direct debit service provider no later than 72 hours after the rewards platform computing system receives the qualifying transaction file from the one or more payment card transaction reporter computing devices, the debit file including the amount owed by the merchant for the at least one payment card transaction made with the payment card at the merchant as well as instructions to direct debit the amount from the merchant bank account; and associate an additional amount of reward credits with the card user in the one or more rewards platform databases, the additional amount of reward credits being provided for the at least one payment card transaction made with the payment card at the merchant.

2. The non-transitory machine readable medium of claim 1 wherein the instructions cause the rewards platform computing system to receive a rewards redemption offer file from a third party rewards redemption platform computing device of a third party rewards redemption platform using a standardized input/output interface, the rewards redemption offer file being received by the one or more rewards platform computing devices, the rewards redemption offer file including a list of one or more goods and/or services that the card user can receive in exchange for at least some of the reward credits.

3. The non-transitory machine readable medium of claim 1 wherein the instructions cause the rewards platform computing system to instruct the one or more rewards platform communication interfaces to send a reward credits file to a third party rewards redemption platform computing device of a third party rewards redemption platform using a standardized input/output interface, the reward credits file including the number of reward credits the card user has available to exchange for goods and/or services on the third party rewards redemption platform.

4. The non-transitory machine readable medium of claim 1 wherein the at least one payment card transaction made with the payment card at the merchant is a second or subsequent payment card transaction made by the card user at the merchant within a defined time period, and wherein the additional amount of reward credits associated with the cards user is greater than an amount of reward credits associated with the card user for an initial payment card transaction made by the card user at the merchant during the defined time period.

5. The non-transitory machine readable medium of claim 1 wherein the instructions cause the rewards platform computing system to send the debit file to the direct debit service provider no later than 24 hours after the rewards platform computing system receives the qualifying transaction file from the one or more payment card transaction reporter computing devices.

6. The non-transitory machine readable medium of claim 1 wherein the payment card transaction reporter is a payment card processor and the payment card transaction reporter computing device is a payment card processor computing device.

7. The non-transitory machine readable medium of claim 1 wherein the payment card transaction reporter is a payment card association and the payment card transaction reporter computing device is a payment card association computing device.

8. A method comprising:
receiving a payment card setup file from a card user computing device, the payment card setup file including a card number of a payment card, the payment card setup file being received by one or more rewards platform computing devices that are part of a rewards platform computing system;

associating the card number in the payment card setup file with a card user who is a member of a rewards program and storing the card number and card user information in one or more rewards platform databases;

receiving a merchant setup file from a merchant computing device, the merchant setup file including an authorization to direct debit an amount owed by a merchant participating in the rewards program from a merchant bank account, the merchant setup file being received by the one or more rewards platform computing devices that are part of the rewards platform computing system;

associating the merchant with the authorization to direct debit the amount owed by the merchant and storing the merchant and the authorization in the one or more rewards platform databases;

instructing one or more rewards platform communication interfaces to send a card number file including the card number of the payment card to one or more payment card transaction reporter computing devices of a payment card transaction reporter, the payment card transaction reporter being configured to receive files including payment card transactions from a payment input device at the merchant and process the payment card transactions for the merchant over an electronic payment processing network;

instructing the one or more rewards platform communication interfaces to send a merchant file including a merchant identifier for the merchant to the one or more payment card transaction reporter computing devices;

receiving a qualifying transaction file from the one or more payment card transaction reporter computing devices, the qualifying transaction file including payment card transaction information for at least one payment card transaction made with the payment card at the merchant; the qualifying transaction file being received by the one or more rewards platform computing devices;

instructing the one or more rewards platform communication interfaces to send a debit file to a direct debit service provider computing device of a direct debit service provider no later than 72 hours after the rewards platform computing system receives the qualifying transaction file from the one or more payment card transaction reporter computing devices, the debit file including the amount owed by the merchant for the at least one payment card transaction made with the payment card at the merchant as well as instructions to direct debit the amount from the merchant bank account; and associating an additional amount of reward credits with the card user in the one or more rewards platform databases, the additional amount of reward credits being provided for the at least one payment card transaction made with the payment card at the merchant.

9. The method of claim 8 comprising receiving a rewards redemption offer file from a third party rewards redemption platform computing device of a third party rewards redemption platform using a standardized input/output interface, the rewards redemption offer file being received by the one or more rewards platform computing devices, the rewards redemption offer file including a list of one or more goods and/or services that the card user can receive in exchange for at least some of the reward credits.

10. The method of claim 8 comprising instructing the one or more rewards platform communication interfaces to send a reward credits file to a third party rewards redemption platform computing device of a third party rewards redemption platform using a standardized input/output interface, the reward credits file including the number of reward credits the card user has available to exchange for goods and/or services on the third party rewards redemption platform.

11. The method of claim 8 wherein the at least one payment card transaction made with the payment card at the merchant is a second or subsequent payment card transaction made by the card user at the merchant within a defined time period, and wherein the additional amount of reward credits associated with the cards user is greater than an amount of reward credits associated with the card user for an initial payment card transaction made by the card user at the merchant during the defined time period.

12. The method of claim 8 comprising sending the debit file to the direct debit service provider no later than 24 hours after the rewards platform computing system receives the qualifying transaction file from the one or more payment card transaction reporter computing devices.

13. The method of claim 8 wherein the payment card transaction reporter is a payment card processor and the payment card transaction reporter computing device is a payment card processor computing device.

14. The method of claim 8 wherein the payment card transaction reporter is a payment card association and the payment card transaction reporter computing device is a payment card association computing device.

15. A rewards platform computing system comprising:
at least one processor; and
memory storing instructions configured to instruct the at least one processor to:
receive a payment card setup file from a card user computing device, the payment card setup file including a card number of a payment card, the payment card setup file being received by one or more rewards platform computing devices that are part of the rewards platform computing system;
associate the card number in the payment card setup file with a card user who is a member of a rewards program and store the card number and card user information in one or more rewards platform databases;
receive a merchant setup file from a merchant computing device, the merchant setup file including an authorization to direct debit an amount owed by a merchant participating in the rewards program from a merchant bank account, the merchant setup file being received by the one or more rewards platform computing devices that are part of the rewards platform computing system;
associate the merchant with the authorization to direct debit the amount owed by the merchant and store the merchant and the authorization in the one or more rewards platform databases;
instruct one or more rewards platform communication interfaces to send a card number file including the card number of the payment card to one or more payment card transaction reporter computing devices of a payment card transaction reporter, the payment card transaction reporter being configured to receive files including payment card transactions from a payment input device at the merchant and process the payment card transactions for the merchant over an electronic payment processing network;
instruct the one or more rewards platform communication interfaces to send a merchant file including a merchant identifier for the merchant to the one or more payment card transaction reporter computing devices;
receive a qualifying transaction file from the one or more payment card transaction reporter computing devices, the qualifying transaction file including payment card transaction information for at least one payment card transaction made with the payment card at the merchant; the qualifying transaction file being received by the one or more rewards platform computing devices;
instruct the one or more rewards platform communication interfaces to send a debit file to a direct debit service provider computing device of a direct debit service provider no later than 72 hours after the rewards platform computing system receives the qualifying transaction file from the one or more payment card transaction reporter computing devices, the debit file including the amount owed by the merchant for the at least one payment card transaction made with the payment card at the merchant as well as instructions to direct debit the amount from the merchant bank account; and
associate an additional amount of reward credits with the card user in the one or more rewards platform databases, the additional amount of reward credits being provided for the at least one payment card transaction made with the payment card at the merchant.

16. The rewards platform computing system of claim 15 wherein the instructions cause the rewards platform computing system to receive a rewards redemption offer file from a third party rewards redemption platform computing device of a third party rewards redemption platform using a standardized input/output interface, the rewards redemption offer file being received by the one or more rewards platform computing devices, the rewards redemption offer file including a list of one or more goods and/or services that the card user can receive in exchange for at least some of the reward credits.

17. The rewards platform computing system of claim 15 wherein the instructions cause the rewards platform computing system to instruct the one or more rewards platform communication interfaces to send a reward credits file to a third party rewards redemption platform computing device of a third party rewards redemption platform using a standardized input/output interface, the reward credits file including the number of reward credits the card user has available to exchange for goods and/or services on the third party rewards redemption platform.

18. The rewards platform computing system of claim 15 wherein the at least one payment card transaction made with the payment card at the merchant is a second or subsequent payment card transaction made by the card user at the merchant within a defined time period, and wherein the additional amount of reward credits associated with the cards user is greater than an amount of reward credits associated with the card user for an initial payment card transaction made by the card user at the merchant during the defined time period.

19. The rewards platform computing system of claim 15 wherein the instructions cause the rewards platform computing system to send the debit file to the direct debit service provider no later than 24 hours after the rewards platform computing system receives the qualifying transaction file from the one or more payment card transaction reporter computing devices.

20. The rewards platform computing system of claim 15 wherein the payment card transaction reporter is a payment card processor and the payment card transaction reporter computing device is a payment card processor computing device.

21. The rewards platform computing system of claim 15 wherein the payment card transaction reporter is a payment card association and the payment card transaction reporter computing device is a payment card association computing device.

\* \* \* \* \*